US009300631B2

(12) United States Patent
Suzuki

(10) Patent No.: US 9,300,631 B2
(45) Date of Patent: Mar. 29, 2016

(54) INFORMATION PROCESSING SYSTEM, INFORMATION PROCESSING APPARATUS, APPARATUS, AND NON-TRANSITORY COMPUTER READABLE MEDIUM STORING INFORMATION PROCESSING PROGRAM

(71) Applicant: FUJI XEROX CO., LTD., Tokyo (JP)

(72) Inventor: Takayuki Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 608 days.

(21) Appl. No.: 13/648,466

(22) Filed: Oct. 10, 2012

(65) Prior Publication Data

US 2013/0246506 A1 Sep. 19, 2013

(30) Foreign Application Priority Data

Mar. 14, 2012 (JP) ................................. 2012-057670

(51) Int. Cl.
*G06F 15/16* (2006.01)
*H04L 29/06* (2006.01)
*G06F 3/12* (2006.01)
*G06F 21/60* (2013.01)

(52) U.S. Cl.
CPC .......... *H04L 63/0209* (2013.01); *G06F 3/1285* (2013.01); *G06F 3/1291* (2013.01); *G06F 21/606* (2013.01); *G06F 21/608* (2013.01); *H04L 63/029* (2013.01)

(58) Field of Classification Search
CPC ... G06F 3/1285; G06F 3/1287; G06F 3/1234; G06F 3/1232; G06F 3/1288; G06F 3/1289; G06F 3/129; G06F 3/1291; G06F 3/1236; G06F 3/1204; G06F 3/1229; H04L 63/029
See application file for complete search history.

(56) References Cited

U.S. PATENT DOCUMENTS

| | | | | |
|---|---|---|---|---|
| 6,581,092 B1 * | 6/2003 | Motoyama et al. | ........... | 709/219 |
| 6,859,832 B1 * | 2/2005 | Gecht et al. | ................... | 709/224 |
| 6,978,299 B1 * | 12/2005 | Lodwick | ....................... | 709/223 |
| 2005/0144200 A1 * | 6/2005 | Hesselink et al. | ............ | 707/204 |
| 2007/0024895 A1 * | 2/2007 | Clark | ........................... | 358/1.15 |
| 2008/0170585 A1 | 7/2008 | Shoji et al. | | |
| 2008/0225328 A1 * | 9/2008 | Milton | ........................ | 358/1.15 |
| 2009/0091783 A1 * | 4/2009 | Kazume et al. | .............. | 358/1.15 |

(Continued)

FOREIGN PATENT DOCUMENTS

JP    A-2008-176436    7/2008

*Primary Examiner* — Blake Rubin
(74) *Attorney, Agent, or Firm* — Oliff PLC

(57) ABSTRACT

An information processing system includes an information processing apparatus, a first apparatus connected to the information processing apparatus with a firewall interposed therebetween, and a second apparatus connected to the information processing apparatus with the firewall interposed therebetween and is connected to the first apparatus within the firewall. The information processing apparatus includes a first receiving unit receiving a communication from the first apparatus and a first transmitting unit that transmits an instruction to request the second apparatus to transmit information to the first apparatus. The first apparatus includes a second receiving unit receiving a communication from the first transmitting unit and a second transmitting unit that transmits an instruction to the second apparatus. The second apparatus includes a third receiving unit receiving a communication from the second transmitting unit and a third transmitting unit that transmits information to the information processing apparatus.

6 Claims, 18 Drawing Sheets

(56) References Cited

U.S. PATENT DOCUMENTS

2010/0085597 A1* 4/2010 Vulugundam ............... 358/1.15
2011/0058208 A1* 3/2011 Takahashi .................... 358/1.14
2011/0134456 A1* 6/2011 Tsujimoto .................... 358/1.13
2011/0276986 A1* 11/2011 Kamath et al. ................ 719/328
2013/0222837 A1* 8/2013 Watanabe .................... 358/1.14

* cited by examiner

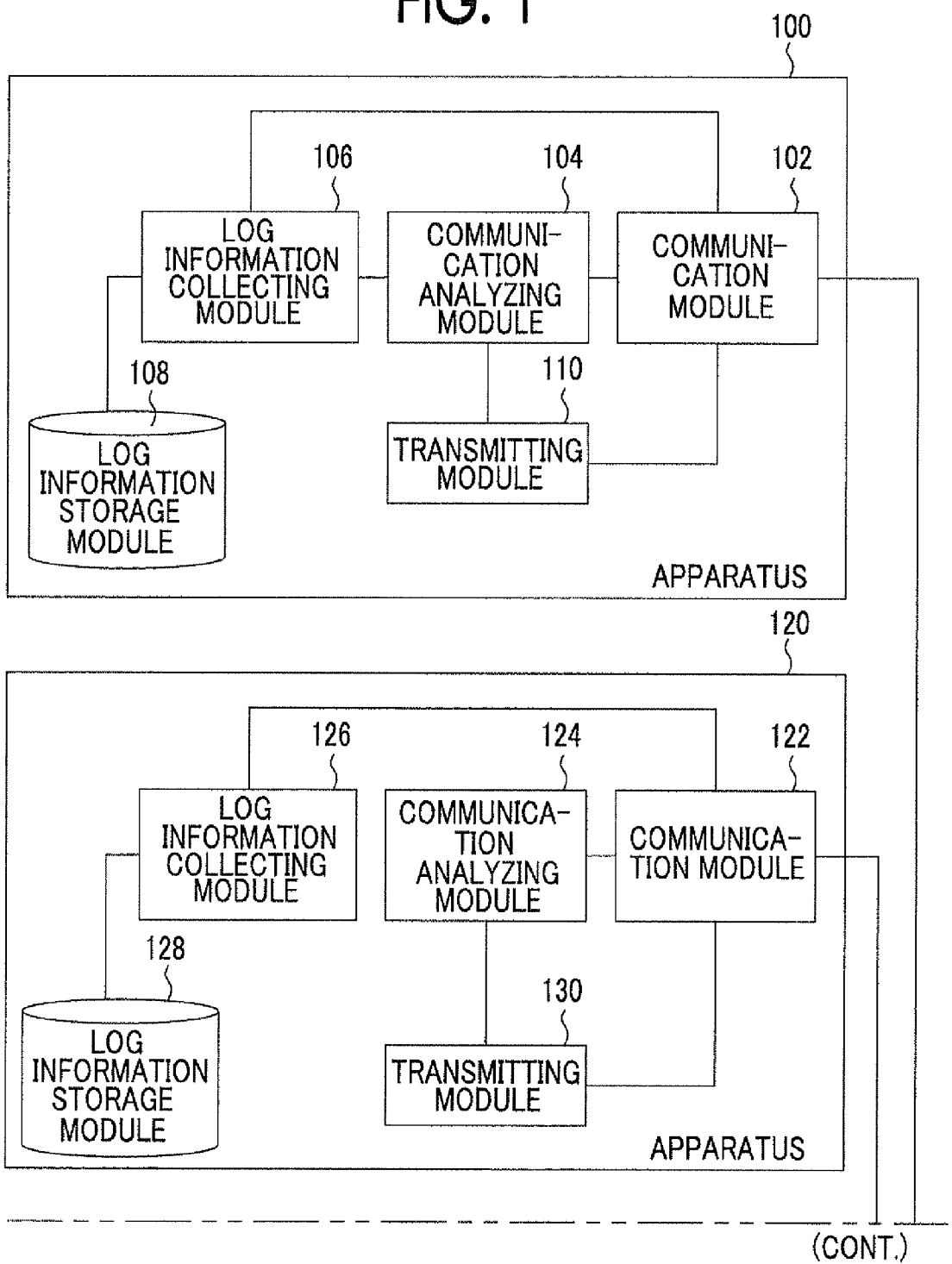

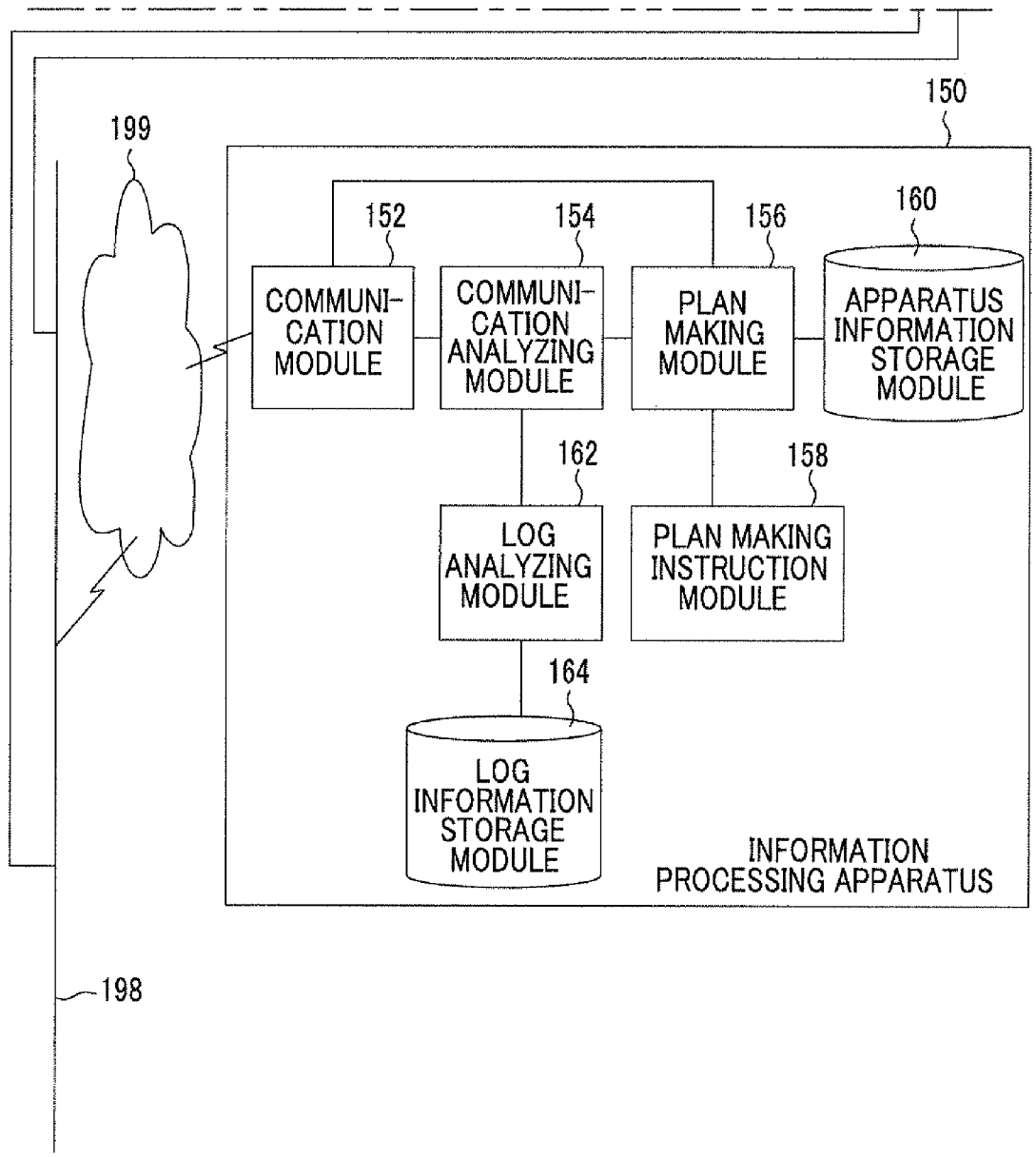

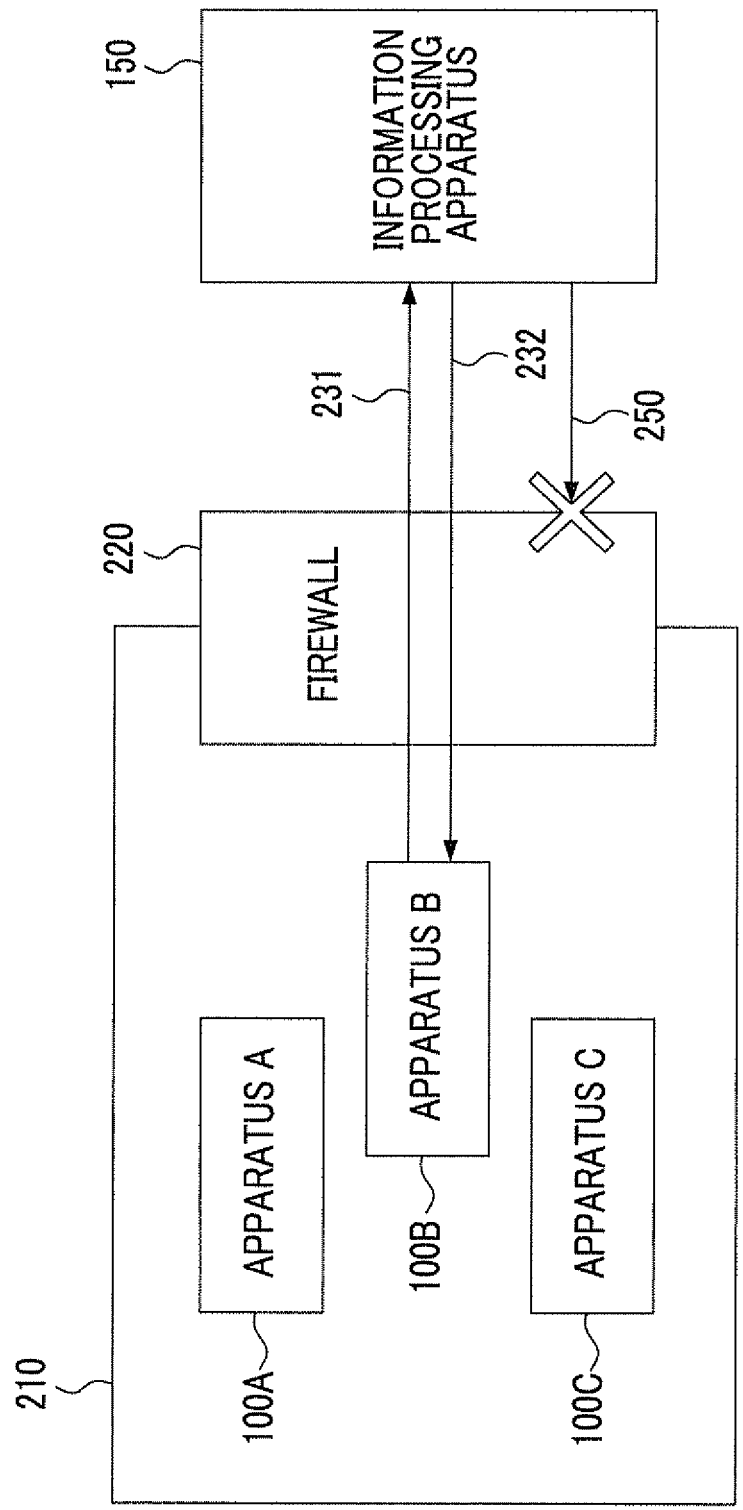

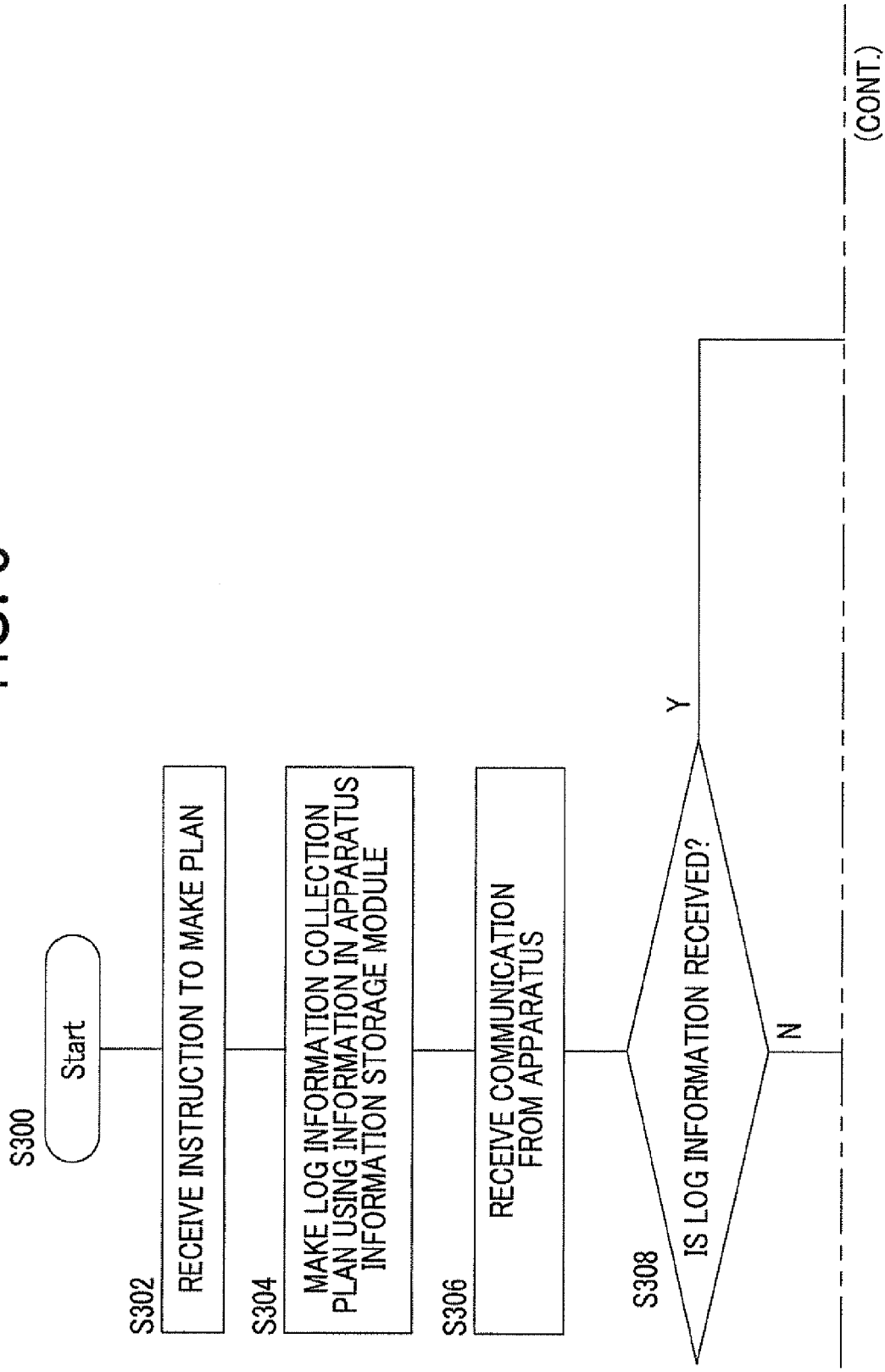

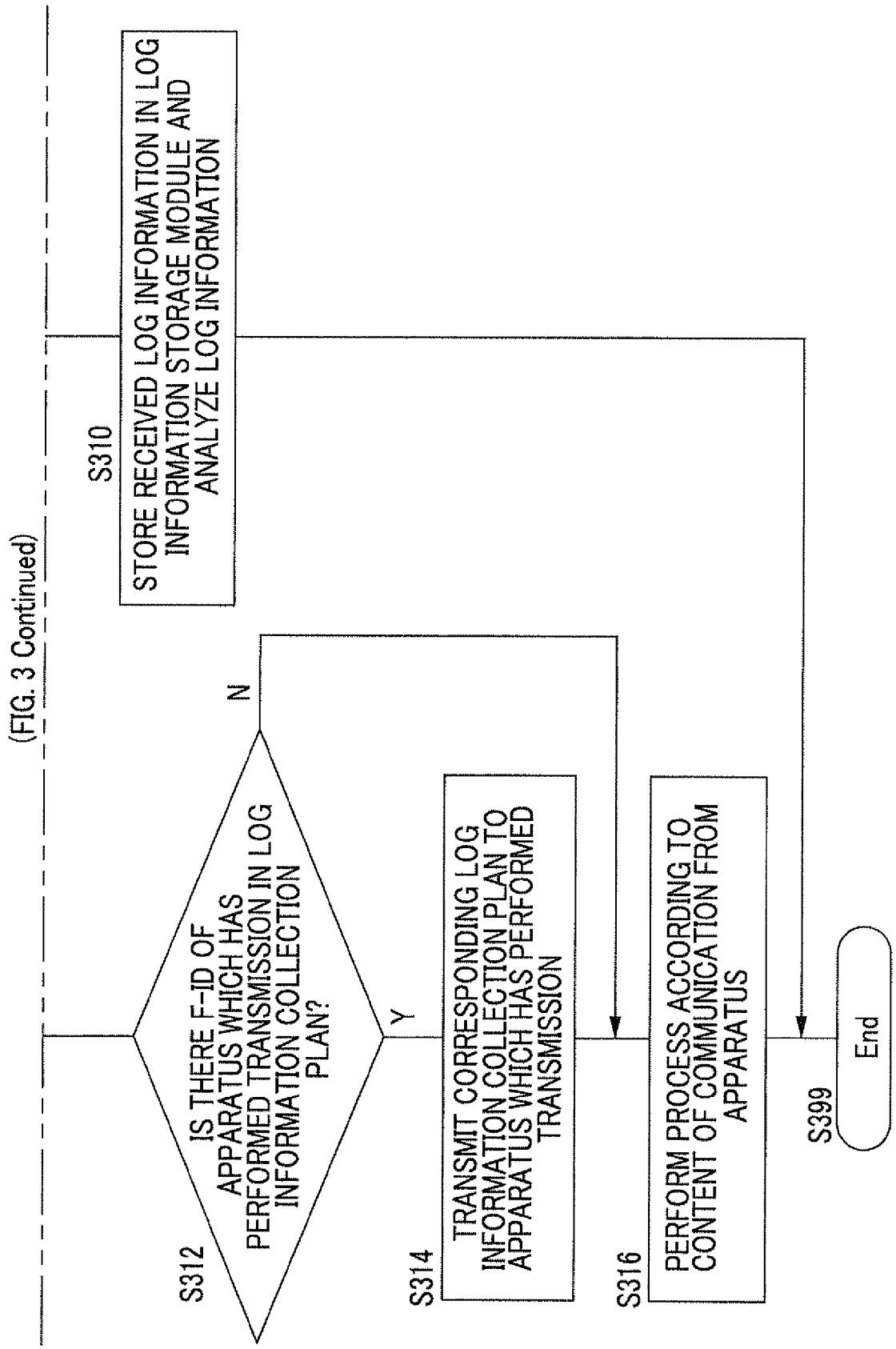

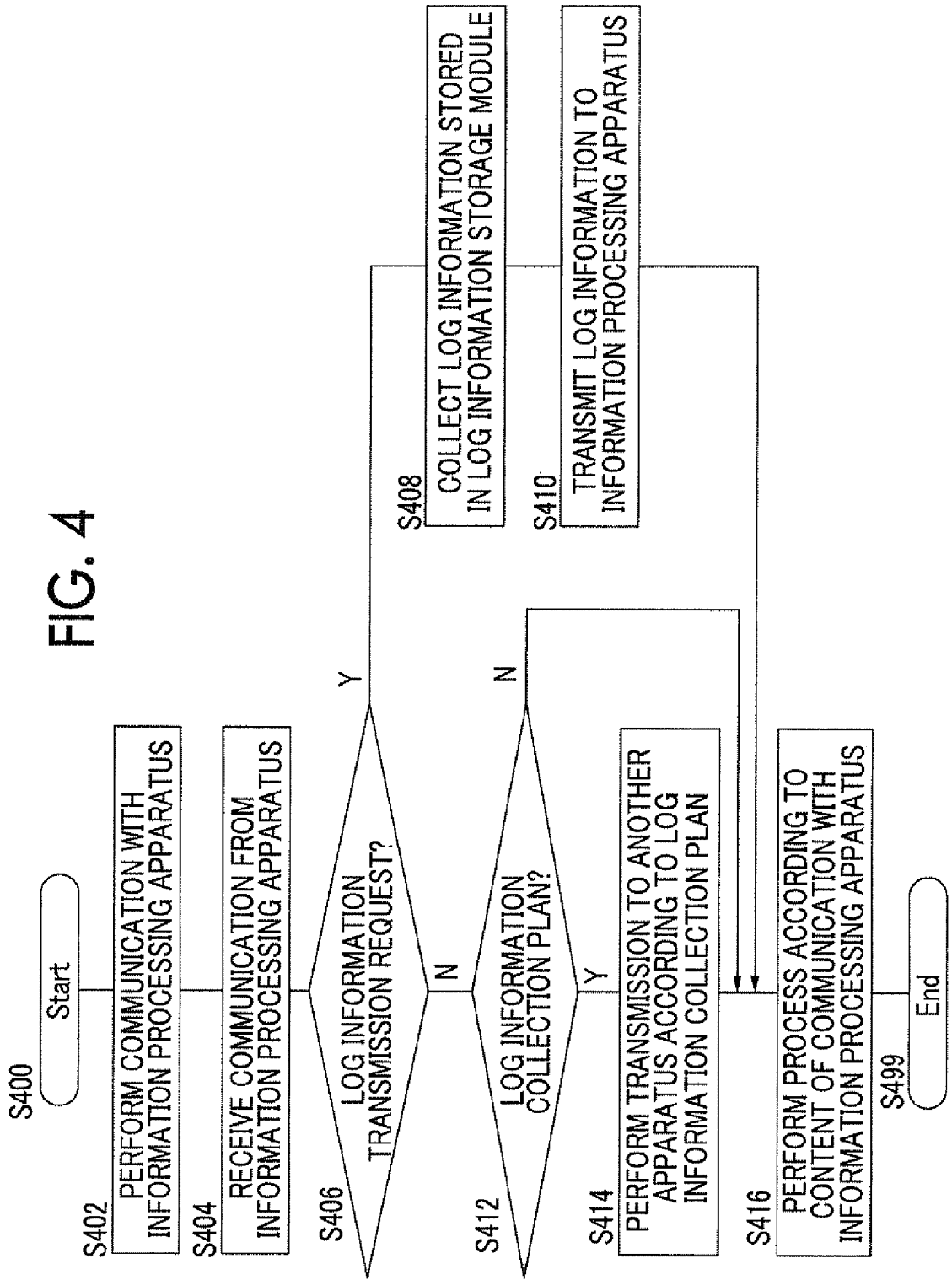

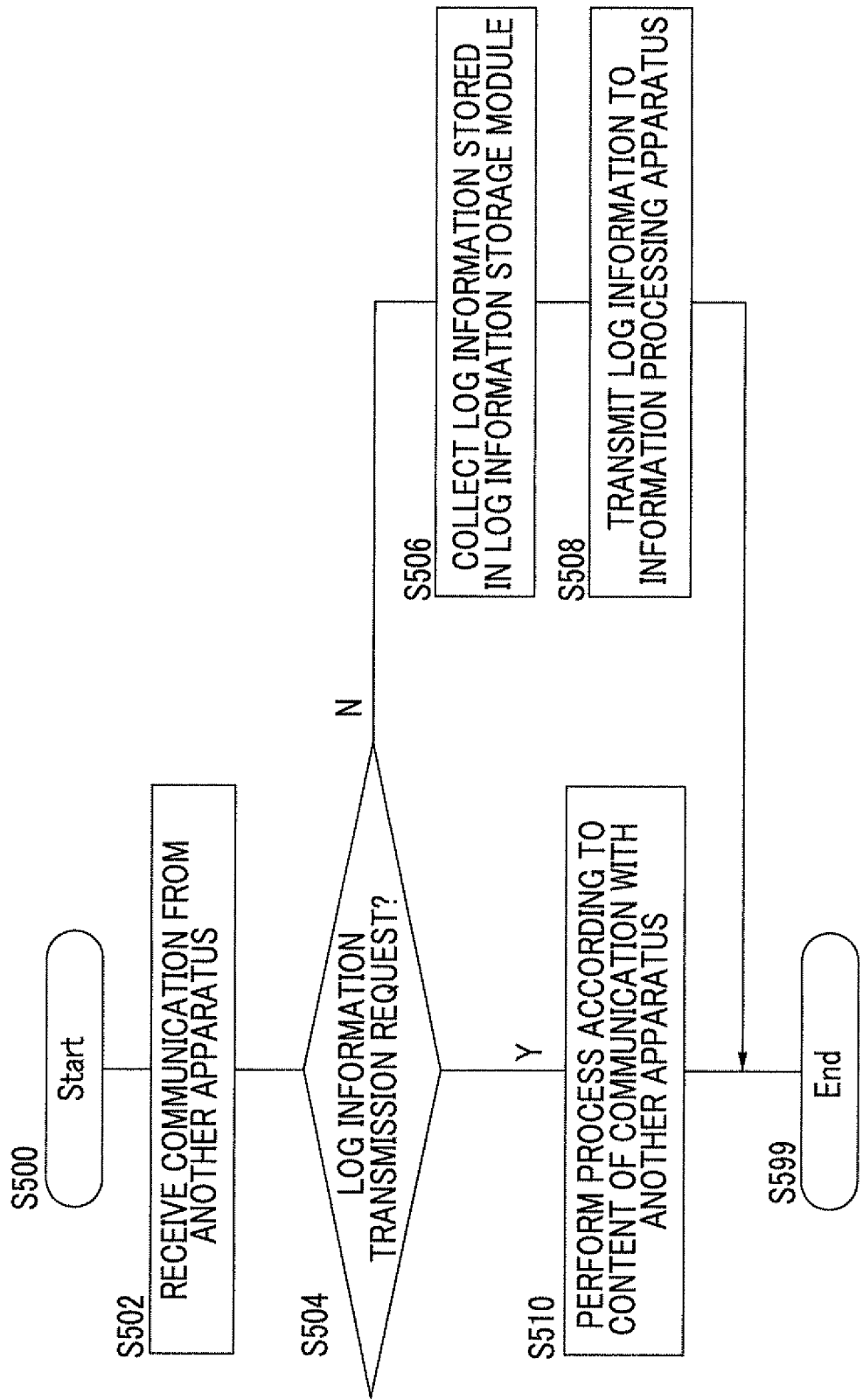

FIG. 6

| No. | IP ADDRESS |
|---|---|
|  |  |

FIG. 7

| No. | APPARATUS ID |
|---|---|
|  |  |

FIG. 12

| APPARATUS ID | LOG INFORMATION CAPACITY |
|---|---|
|  |  |

1210 / 1220 / 1200

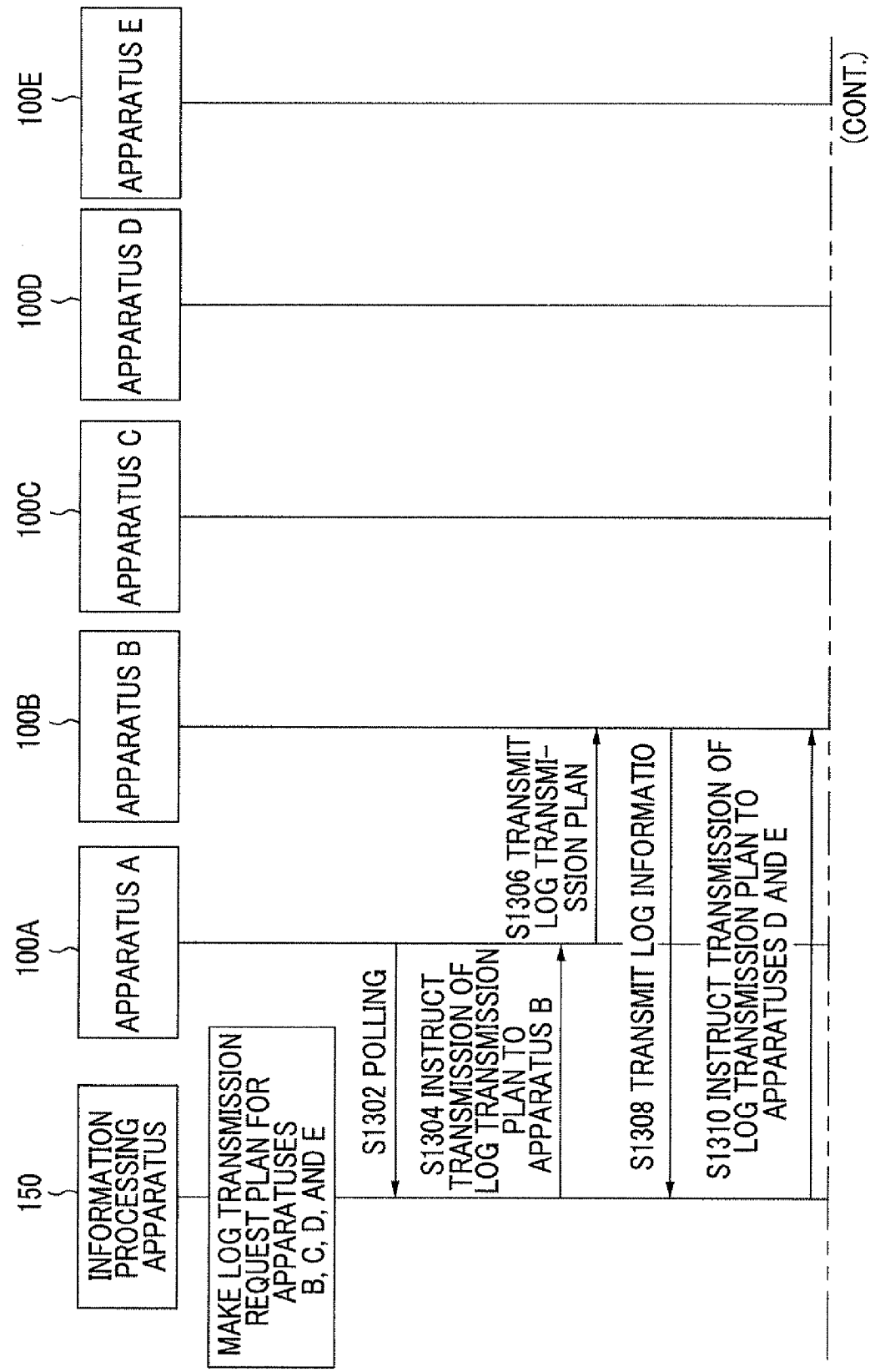

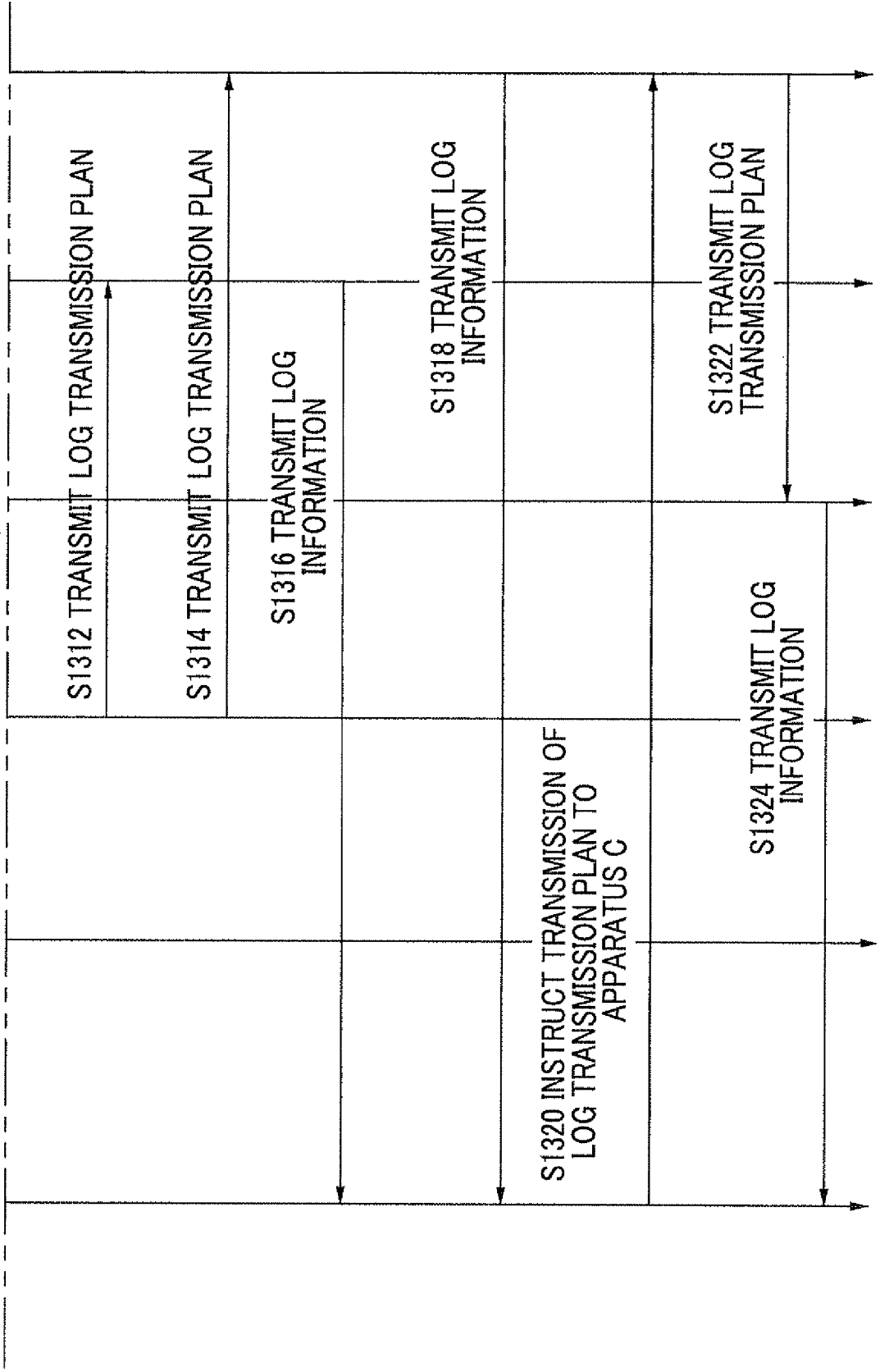

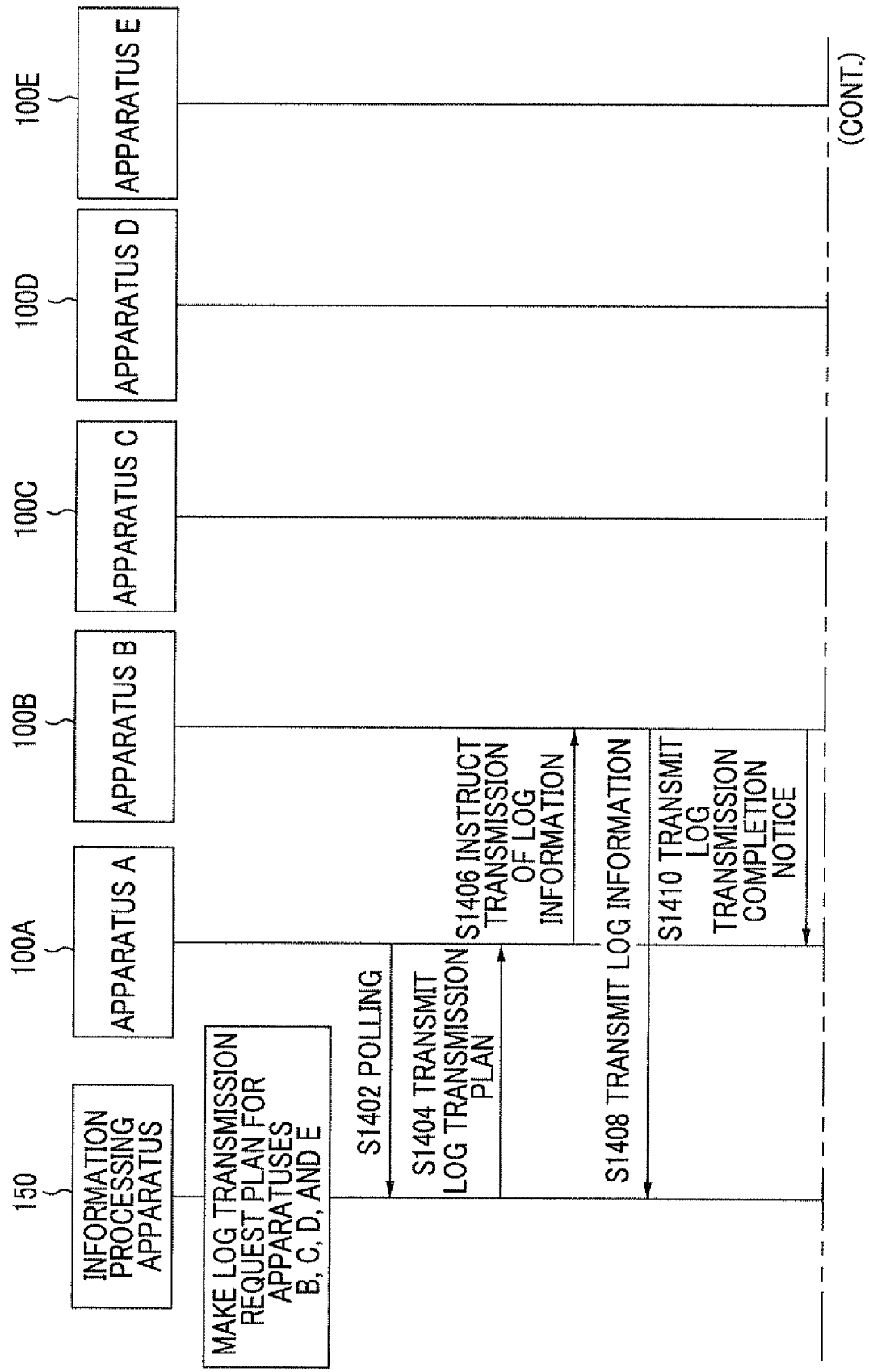

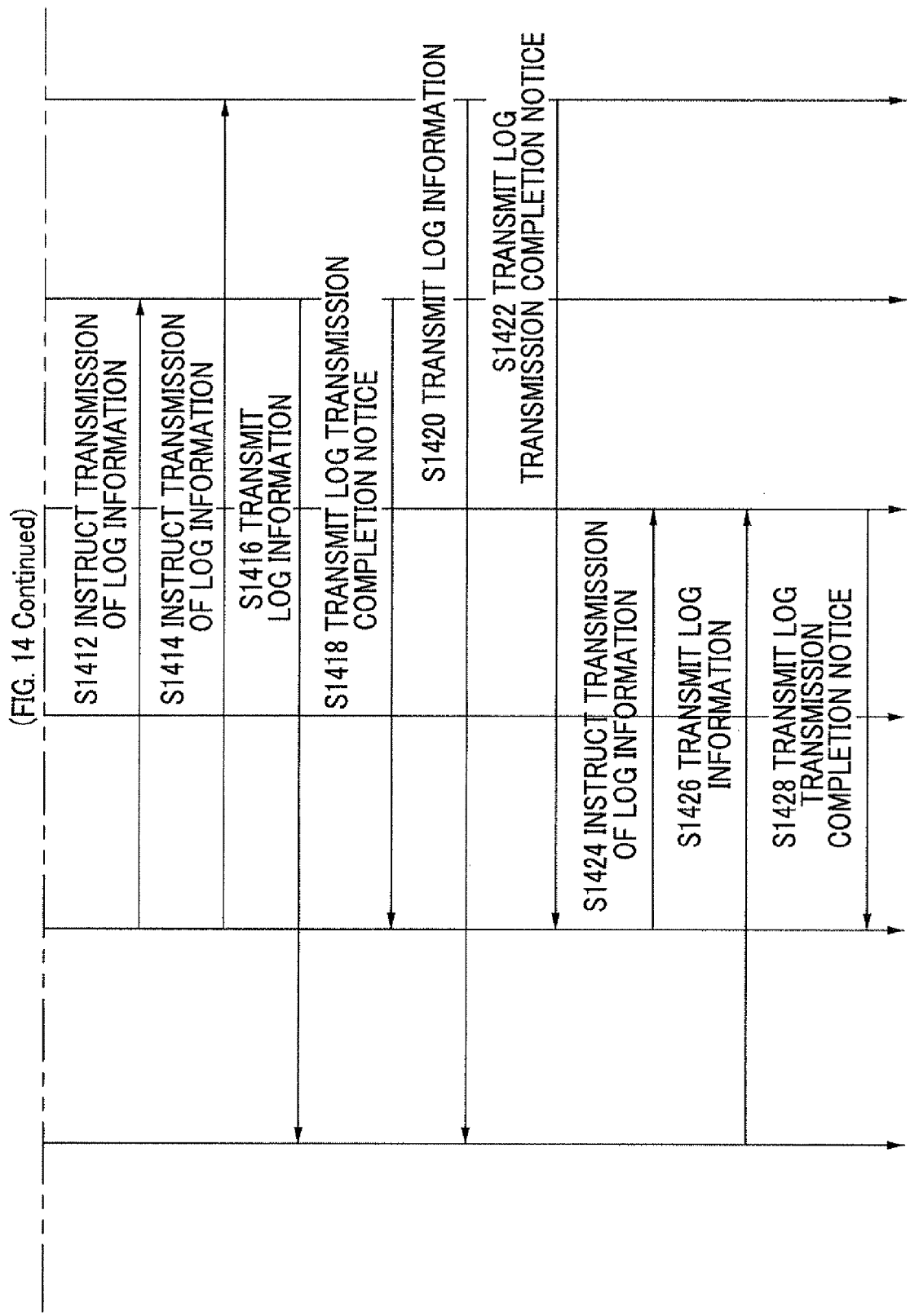

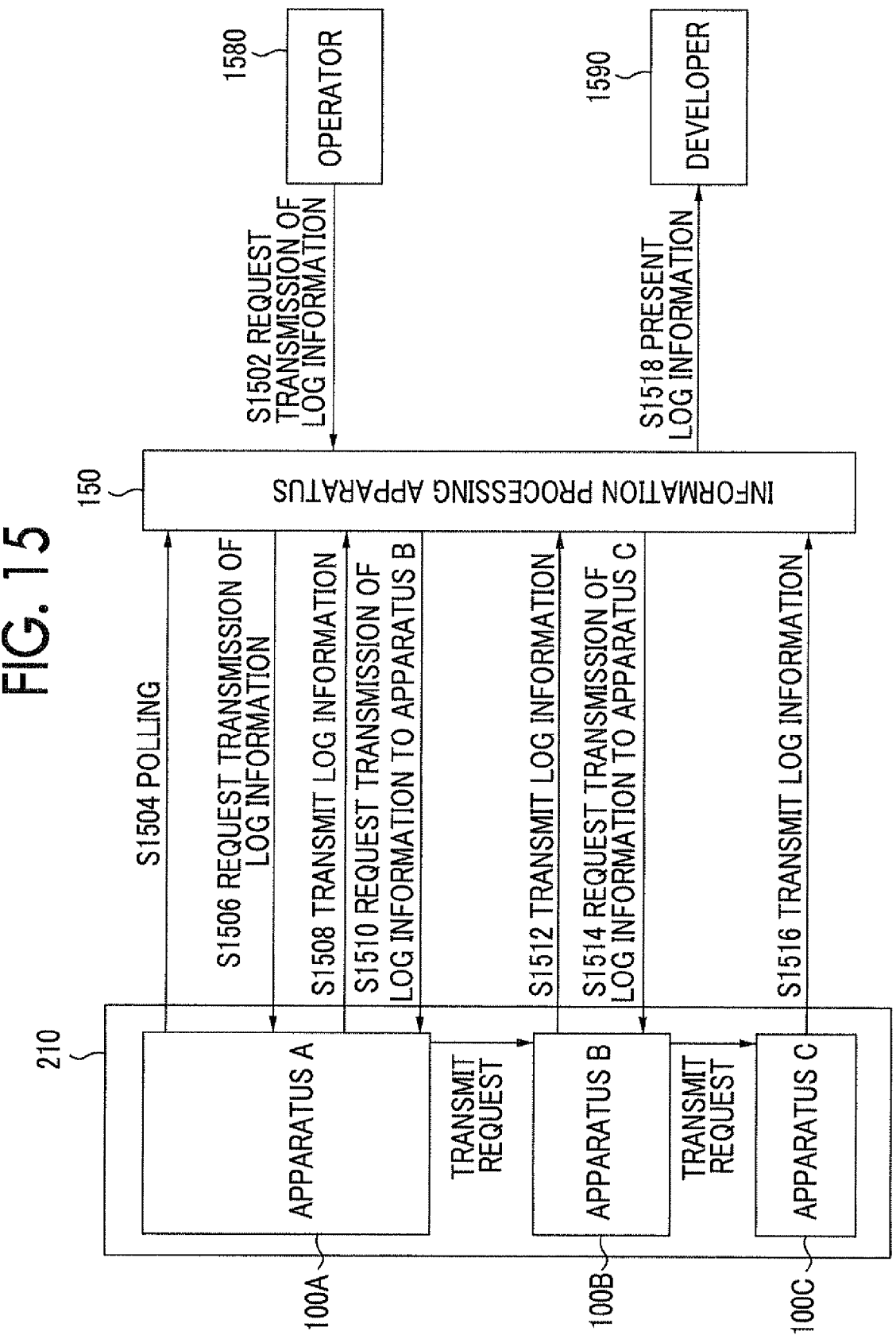

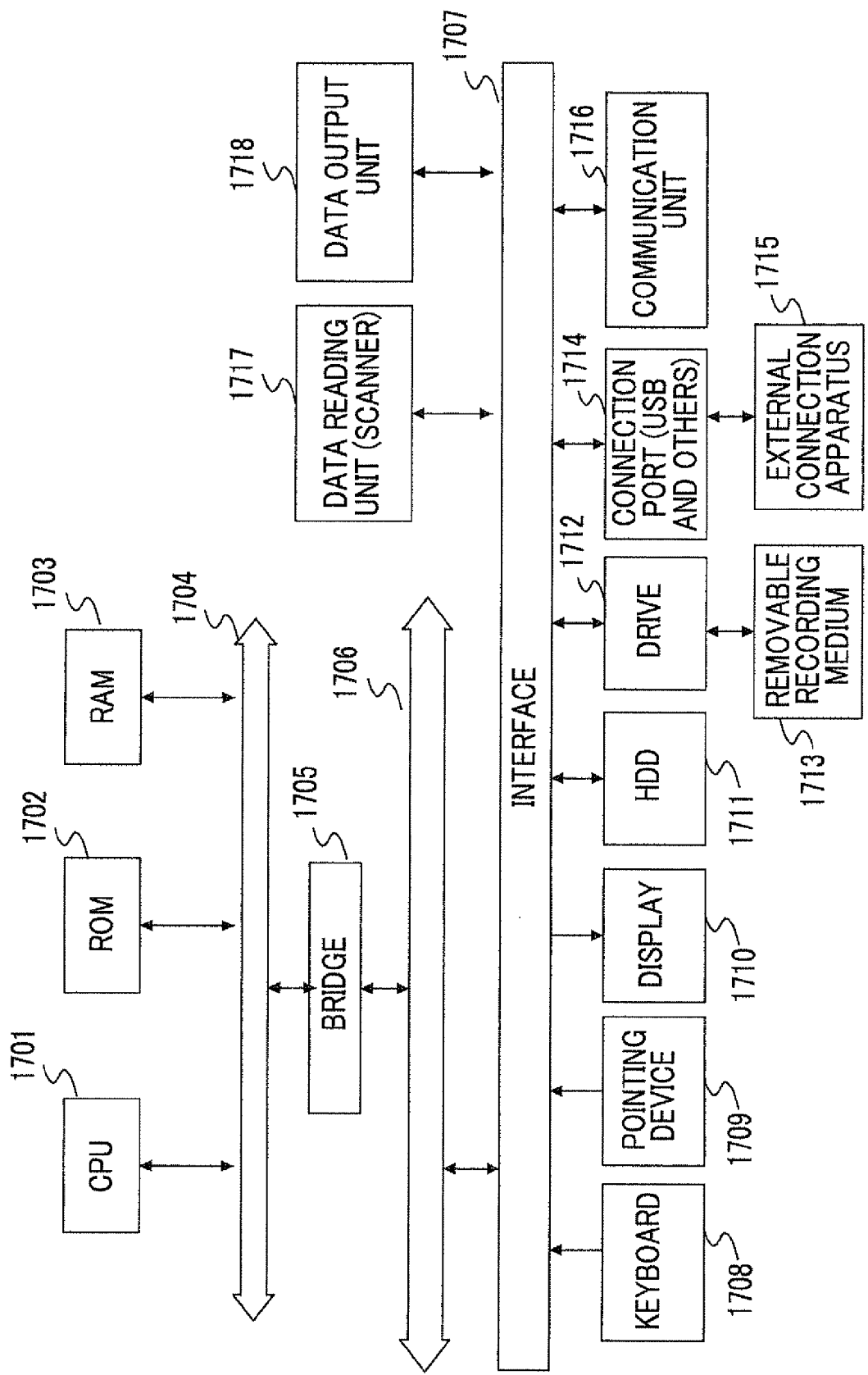

INFORMATION PROCESSING SYSTEM, INFORMATION PROCESSING APPARATUS, APPARATUS, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2012-057670 filed Mar. 14, 2012.

BACKGROUND

Technical Field

The present invention relates to an information processing system, an information processing apparatus, an apparatus, and a non-transitory computer readable medium storing an information processing program.

SUMMARY

According to an aspect of the invention, there is provided an information processing system including: an information processing apparatus; a first apparatus that is connected to the information processing apparatus with a firewall interposed therebetween; and a second apparatus that is connected to the information processing apparatus with the firewall interposed therebetween and is connected to the first apparatus in the same firewall, wherein the information processing apparatus includes a first receiving unit that receives a communication from the first apparatus and a first transmitting unit that transmits, to the first apparatus, an instruction to request the second apparatus, which is another apparatus in the firewall including the first apparatus, to transmit information stored in the second apparatus when the first receiving unit receives the communication from the first apparatus, the first apparatus includes a second receiving unit that receives a communication from the first transmitting unit and a second transmitting unit that, when the communication received by the second receiving unit includes the instruction to request the second apparatus to transmit the information stored in the second apparatus, transmits the instruction to the second apparatus, and the second apparatus includes a third receiving unit that receives a communication from the second transmitting unit and a third transmitting unit that, when the communication received by the third receiving unit includes an instruction to request a host apparatus to transmit information stored in the host apparatus, transmits the information to the information processing apparatus.

BRIEF DESCRIPTION OF THE DRAWINGS

Exemplary embodiments of the present invention will be described in detail based on the following figures, wherein:

FIG. 1 is a conceptual module configuration diagram illustrating an example of a structure according to a first exemplary embodiment;

FIG. 2 is a diagram illustrating an example of the relationship among apparatuses, an information processing apparatus, and a firewall;

FIG. 3 is a flowchart illustrating an example of a process according to the first exemplary embodiment (information processing apparatus);

FIG. 4 is a flowchart illustrating an example of a process according to the first exemplary embodiment (apparatus (A));

FIG. 5 is a flowchart illustrating an example of a process according to the first exemplary embodiment (apparatus (B));

FIG. 6 is a diagram illustrating an example of the data structure of a log information collection plan;

FIG. 7 is a diagram illustrating an example of the data structure of the log information collection plan;

FIG. 12 is a diagram illustrating an example of the data structure of an apparatus ID and log information capacity correspondence table;

FIG. 13 is a flowchart illustrating an example of a process according to the first exemplary embodiment;

FIG. 14 is a flowchart illustrating an example of a process according to a second exemplary embodiment;

FIG. 15 is a diagram illustrating an example of a process according to a third exemplary embodiment;

FIG. 17 is a block diagram illustrating an example of the hardware structure of a computer for implementing an apparatus according to this exemplary embodiment.

DETAILED DESCRIPTION

Figure 8:
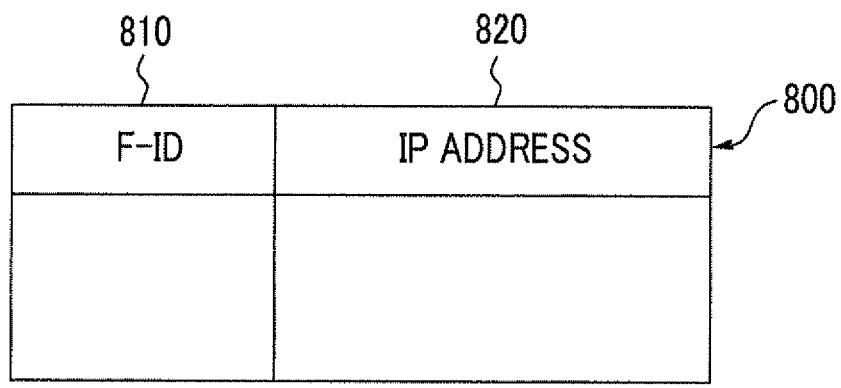
FIG. 8 is a diagram illustrating an example of the data structure of an F-ID and IP address correspondence table.

Before an exemplary embodiment is described, a technique which is the premise of this exemplary embodiment will be described. FIG. 2 is a diagram illustrating an example of the relationship among an apparatus 100, an information processing apparatus 150, and a firewall 220. A case in which the information processing apparatus 150 manages, for example, an apparatus A 100A, an apparatus B 100B, and an apparatus C 100C in an office internal communication environment 210 as shown in FIG. 2 will be described, and typically said an office internal communication environment 210 is configured with a local area network (LAN). In many cases, the firewall 220 is located between the local area network (LAN) and the wide area network (WAN), and is installed in the office internal communication environment 210. Therefore, when the information processing apparatus 150 provided in a center collects information (for example, debug log information including a record for the generation of a failure in the apparatus 100 and a failure repair record) stored in each apparatus 100, it is difficult for the information processing apparatus 150 to take a leading role in communication with the apparatus 100. Therefore, communication between the apparatus 100 and the information processing apparatus 150 is established by polling communication from the apparatus 100. According to this structure, it is possible to secure the office internal communication environment 210, but it is difficult to transmit a processing request from the information processing apparatus 150 to the apparatus 100 until the apparatus 100 performs polling communication. Examples of the apparatus include image processing apparatuses (for example, a copier, a facsimile machine, a scanner, a printer, and a multi-function machine (for example, an image processing apparatus having two or more functions of a scanner, a printer, a copier, and a facsimile machine)) and other office apparatuses. Any apparatus may be used as long as it is connected through a communication line and transmits information stored therein to the information processing apparatus 150.

The information processing apparatus 150 has a function of collecting information stored in the apparatus 100. For example, the developer of the apparatus 100 may designate a collection target apparatus 100 and collect information from the apparatus 100, in order to use the information for investigation during failure response. The collection is performed as follows: an information transmission request is transmitted as an instruction from the information processing apparatus 150 to the apparatus 100 and the apparatus 100 receives the information transmission request and transmits information to the information processing apparatus 150. However, it is necessary to wait for the transmission of the information transmission request until the apparatus 100 performs polling communication. As shown in FIG. 2, when there is an apparatus-sent communication 231 from the apparatus B 100B, the information processing apparatus 150 is capable of transmitting an information processing apparatus-sent communication 232. An instruction to transmit information stored in the apparatus B 100B may be included in the information processing apparatus-sent communication 232, which makes it possible to transmit the information stored in the apparatus B 100B from the apparatus B 100B. However, when the apparatus-sent communication 231 has not been transmitted from the apparatus C 100C, an information processing apparatus-sent communication 250 transmitted to the apparatus C 100C is interrupted by the firewall 220.

A detailed example will be described.

In a case in which the period of polling communication from the apparatus from which information is desired to be collected is set such that the polling communication is performed once a day at 1:00 a.m., even when information is desired to be collected at 6:00 p.m., it is difficult to collect information until the apparatus performs polling communication at 1:00 a.m. the next day. Therefore, the collection of information is delayed from 6:00 p.m. to 1:00 a.m., that is, for 7 hours.

A case is considered in which, when there are apparatuses A, B, and C from which information is desired to be collected and the period of polling communication is set such that the polling communication is performed once a day at 1:00 a.m., information collection is performed on each apparatus considering the load of the network. The apparatuses A, B, and C perform polling communication at 1:00 a.m. the first day and an information transmission request is transmitted only to the apparatus A. The same operation is performed on the apparatus B at 1:00 a.m. the next day and is performed on the apparatus C at 1:00 a.m. the day after next. Then, it takes a minimum of three days to collect information from all of the apparatuses A, B, and C.

Next, exemplary embodiments of the invention will be described with reference to the accompanying drawings.

First Exemplary Embodiment

FIG. 1 is a conceptual module configuration diagram illustrating an example of a structure according to a first exemplary embodiment.

The term "module" refers generally to a component, such as logically separable software (computer program) and hardware. Therefore, a module in this exemplary embodiment indicates not only a module in a computer program, but also a module in a hardware structure. Thus, this exemplary embodiment relates to a computer program (including a program which causes a computer to perform each process, a program which causes a computer to function as each unit, and a program which causes a computer to implement the functions of each unit) that causes a computer to function as modules, a system, and a method. For convenience of description, as used herein, "store," "be stored", or the equivalents thereof mean that a computer program is stored in a storage device or is controlled such that it is stored in a storage device when the exemplary embodiment relates to the computer program. The module may be in one-to-one correspondence with a function. When modules are mounted, one module may be configured as one program, plural modules may be formed by one program, or one module may be formed by plural programs. Plural modules may be implemented by one computer, or one module may be implemented by plural computers in distributed or parallel environments. One module may include other modules. Hereinafter, the term "connection" includes physical connection and logical connection (for example, the transmission and reception of data, instructions, and the reference relationship between data). The term "predetermined" refers to being decided prior to a target process. The term "predetermined" includes not only determination before a process according to the exemplary embodiment starts, but also determination according to situations and conditions at that time or situations and conditions up to that time before a target process after the process according to the exemplary embodiment starts. In addition, the sentence "when A is satisfied, B is performed" means that "if it is determined that A is satisfied, B is performed". However, a case in which it is not necessary to determine whether A is satisfied is excluded.

The term "system" or "apparatus" includes a structure including, for example, one computer, hardware, and a device and a structure in which, for example, plural computers, hardware, and devices are connected to each other by a communication unit, such as a network (including one-to-one correspondence communication connection). In the specification, "apparatus" is synonymous with "system." Naturally, the "system" does not include anything that is merely a social "structure" (social system) that includes artificial decisions.

For each process by each module or each process when plural processes are performed in a module, target information is read from a storage device and is then processed and the process result is written to the storage device. Therefore, in some cases, the description of reading information from the storage device before the process and writing the process result to the storage device after the process is omitted. The storage device may include, for example, a hard disk, a Random Access Memory (RAM), an external storage medium, a storage device through a communication line, and a register in a Central Processing Unit (CPU).

An information processing system according to the first exemplary embodiment includes plural apparatuses (FIG. 1 shows two apparatuses, that is, an apparatus 100 and an apparatus 120, but three or more apparatuses may be provided) and an information processing apparatus 150, as shown in FIG. 1. The information processing apparatus 150 manages the apparatus 100. The apparatus 100, the apparatus 120, and the information processing apparatus 150 are connected to each other through a communication line 199. As described above, there is a firewall and the apparatus 100 and the apparatus 120 are provided in the firewall. In addition, the apparatuses in the firewall are connected to each other through a communication line 198.

The outline of a process is as follows. When there is any communication (for example, polling communication or information transmission) from the apparatus in the firewall and the information processing apparatus 150 issues an instruction to transmit an information transmission request to another apparatus in the same firewall, the apparatus which has performed communication acquires the instruction and transfers the instruction to the apparatus, which is an instruction target.

Specifically, in a situation in which there are apparatuses A and B in the firewall and information stored in the apparatus A is desired to be collected, when there is polling communication from the apparatus B, the information processing apparatus 150 instructs the apparatus B to transfer the information transmission request to the apparatus A.

The apparatus 100 includes a communication module 102, a communication analyzing module 104, a log information collecting module 106, a log information storage module 108, and a transferring module 110.

The apparatus 120 includes a communication module 122, a communication analyzing module 124, a log information collecting module 126, a log information storage module 128, and a transferring module 130. Since the internal structure of the apparatus 120 is the same as that of the apparatus 100, the modules in the apparatus 100 will be described below.

The information processing apparatus 150 includes a communication module 152, a communication analyzing module 154, a plan making module 156, a plan making instruction module 158, an apparatus information storage module 160, a log analyzing module 162, and a log information storage module 164.

The apparatus 100 and the apparatus 120 are connected to the information processing apparatus 150 with the firewall interposed therebetween. Plural apparatuses 100 are provided in the firewall. When plural apparatuses 100 are distinguished from each other, in some cases, they are referred to as, for example, an apparatus 100(A) and an apparatus 100(B).

The communication module 102 is connected to the communication analyzing module 104, the log information collecting module 106, and the transferring module 110 and is also connected to the communication module 152 of the information processing apparatus 150 through the communication line 199. In addition, the communication module 102 is connected to the communication module 102 of another apparatus 100(B). The communication module 102 communicates with the information processing apparatus 150. For example, the communication module 102 performs polling communication from the apparatus 100 to the information processing apparatus 150 and receives a communication from the information processing apparatus 150. The communication module 102 of the apparatus 100(A) performs communication with another apparatus 100(B) and receives a communication from another apparatus 100(B). The communication module 102 of the apparatus 100(B) performs communication with another apparatus 100(A) and receives a communication from another apparatus 100(A).

The communication analyzing module 104 is connected to the communication module 102, the log information collecting module 106, and the transferring module 110. The communication analyzing module 104 analyzes the communication received by the communication module 102 from the information processing apparatus 150. It is determined whether the communication received by the communication module 102 of the apparatus 100(A) includes an instruction to request another apparatus 100(B) which is connected to the same firewall to transmit the information stored in the apparatus 100(B). In addition, the communication analyzing module 104 analyzes the communication received by the communication module 102 from the apparatus 100(A). It is determined whether the communication received by the communication module 102 of the apparatus 100(B) includes an instruction to request the transmission of the information stored in the log information storage module 108 of the host apparatus (apparatus 100(B)) to the information processing apparatus 150.

The log information collecting module 106 is connected to the communication module 102, the communication analyzing module 104, and the log information storage module 108. When the communication analyzing module 104 of the apparatus 100(B) determines that there is an instruction to request the transmission of the information stored in the log information storage module 108 to the information processing apparatus 150, the log information collecting module 106 transmits the information stored in the log information storage module 108 to the information processing apparatus 150 through the communication module 102 and the communication line 199.

The log information storage module 108 is connected to the log information collecting module 106. The log information storage module 108 stores, for example, debug log information about the apparatus 100.

The transferring module 110 is connected to the communication module 102 and the communication analyzing module 104. When the communication analyzing module 104 determines that the instruction to request another apparatus 100(B) connected in the same firewall to transmit the information stored in the apparatus 100(B) is included, the transferring module 110 transmits the instruction to another apparatus 100(B) through the communication module 102 and the communication line 199.

The communication module 152 is connected to the communication analyzing module 154 and the plan making module 156 and is also connected to the communication module 102 of the apparatus 100 through the communication line 199. The communication module 152 receives, for example, polling communication from the apparatus 100 to the information processing apparatus 150 and the information stored in the apparatus 100 and performs communication with the apparatus 100.

The communication analyzing module 154 is connected to the communication module 152, the plan making module 156, and the log analyzing module 162. The communication analyzing module 154 determines whether the communication module 152 receives, for example, polling communication from the apparatus 100(A). In addition, the communication analyzing module 154 determines whether the communication from the apparatus 100(B) includes the information stored in the apparatus 100(B).

The plan making module 156 is connected to the communication module 152, the communication analyzing module 154, the plan making instruction module 158, and the apparatus information storage module 160. When the communication analyzing module 154 determines that polling communication is received from the apparatus 100(A), the plan making module 156 transmits an instruction to request another apparatus 100(B) in the firewall including the apparatus 100(A) to transmit the information stored in the apparatus 100(B) to the apparatus 100(A) through the communication module 152 and the communication line 199.

In addition, when there are plural apparatuses 100(B) which request the transmission of information, the plan making module 156 makes a plan for a transmission order or a transmission date and time on the basis of a plan making instruction from the plan making instruction module 158. Then, the plan making module 156 transmits the instruction to the apparatus 100(A) through the communication module 152 and the communication line 199 according to the plan. In addition, the plan making module 156 may make a plan on the basis of the communication allowable range of the firewall and the capacity of the information transmitted by the apparatus 100(B). Then, the plan making module 156 transmits the instruction to the apparatus 100(A) through the communication module 152 and the communication line 199 on the basis of the plan. In addition, the plan making module 156 makes a plan using the information stored in the apparatus information storage module 160.

The plan making instruction module 158 is connected to the plan making module 156. The plan making instruction module 158 designates the apparatus from which information is to be collected on the basis of the operation of the operator (for example, the developer) for, for example, a keyboard, a mouse, or a touch panel. Then, the plan making instruction module 158 instructs the plan making module 156 to make a plane for an information transmission order or an information transmission date and time.

The apparatus information storage module 160 is connected to the plan making module 156. The apparatus information storage module 160 stores, for example, information about each apparatus 100. For example, the apparatus information storage module 160 stores a log information collection plan 600, a log information collection plan 700, an F-ID and IP address correspondence table 800, an F-ID and apparatus ID correspondence table 900, an F-ID and network allowable load correspondence table 1000, an IP address and log information capacity correspondence table 1100, and an apparatus ID and log information capacity correspondence table 1200.

The log analyzing module 162 is connected to the communication analyzing module 154 and the log information storage module 164. When the communication analyzing module 154 determines that the communication from the apparatus 100(5) includes the information stored in the apparatus 100(B), the log analyzing module 162 stores the information in the log information storage module 164. Then, the log analyzing module 162 analyzes the information stored in the log information storage module 164.

The log information storage module 164 is connected to the log analyzing module 162. The log information storage module 164 stores the information stored in the apparatus 100(B). In addition, the log information storage module 164 transmits the information to the log analyzing module 162.

FIG. 3 is a flowchart illustrating an example of a process according to the first exemplary embodiment (information processing apparatus 150).

In Step S302, the plan making instruction module 158 receives a plan making instruction input by the operation of the operator for, for example, a keyboard, a mouse, or a touch panel.

In Step S304, the plan making module 156 makes a debug log information collection plan using the information stored in the apparatus information storage module 160. The apparatus information storage module 160 stores the log information collection plan 600 or the log information collection plan 700, the F-ID and IP address correspondence table 800 or the F-ID and apparatus ID correspondence table 900, the F-ID and network allowable load correspondence table 1000, and the IP address and log information capacity correspondence table 1100 or the apparatus ID and log information capacity correspondence table 1200.

The debug log information collection plan to be made includes the transmission order of the apparatus 100 from which the debug log information is transmitted, or the apparatus 100 from which the debug log information is transmitted and the date and time (year, month, day, minute, second, millisecond, or a combination thereof) when the debug log information is transmitted. In addition, plural apparatuses 100 from which the debug log information is transmitted at the same time may be designated. That is, in the debug log information collection plan including the apparatuses 100 and the transmission order, there are plural apparatuses 100 with the same order. In the debug log information collection plan including the transmission date and time, there are plural apparatuses 100 with the same transmission date and time.

Figures 6, 7:
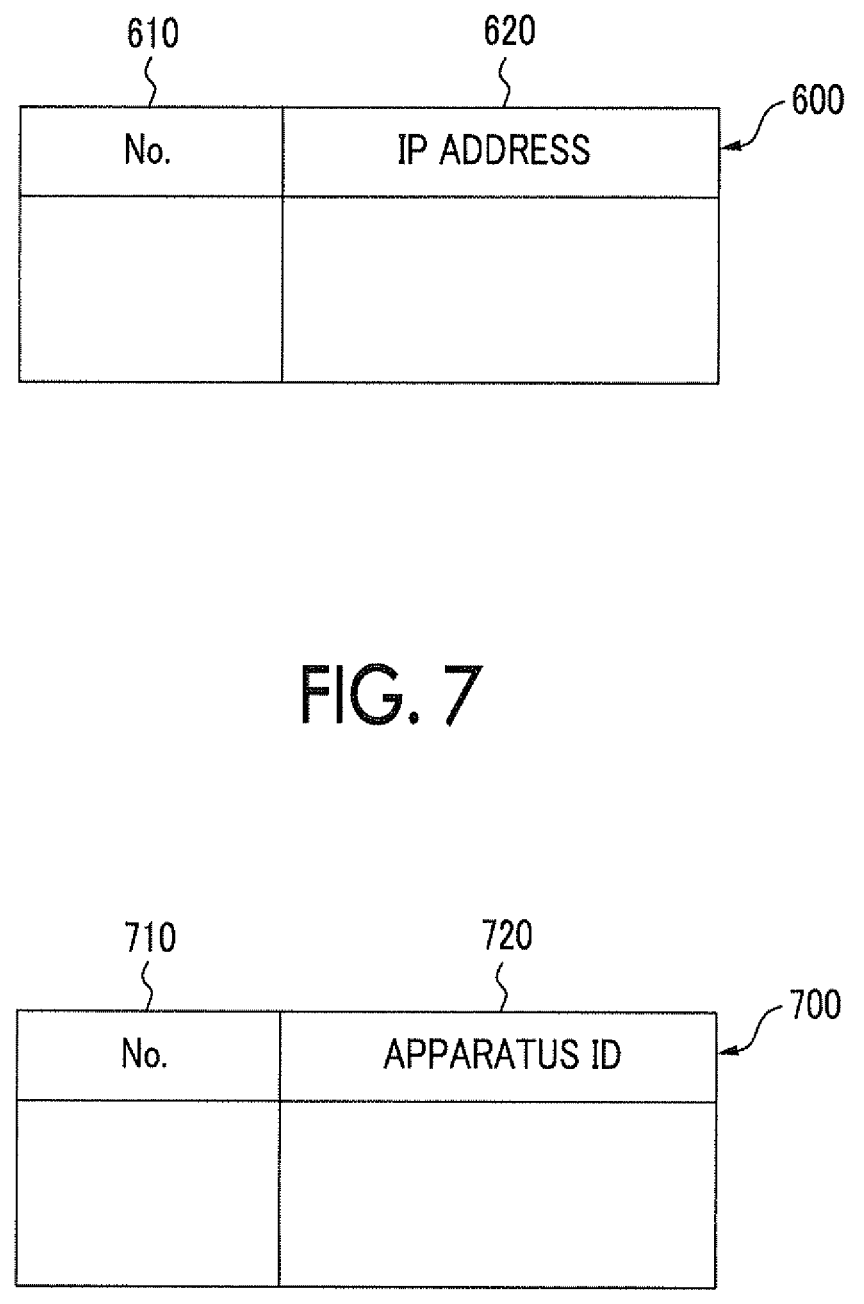

FIG. 6 is a diagram illustrating an example of the data structure of the log information collection plan 600. The log information collection plan 600 includes a No. field 610 and an IP address field 620. The No. field 610 stores the number of the apparatus 100. In addition, the No. field 610 may store the name of the apparatus 100. The IP address field 620 stores the IP address of the apparatus 100. In the debug log information collection plan, the IP address is designated. In this manner, the apparatus 100 receiving the debug log information collection plan specifies the apparatus 100 which will transfer a debug log information transmission request.

FIG. 7 is a diagram illustrating an example of the data structure of the log information collection plan 700. The log information collection plan 700 includes a No. field 710 and an apparatus ID field 720. The No. field 710 is the same as the No. field 610 of the log information collection plan 600. The apparatus ID field 720 stores the apparatus ID (in this exemplary embodiment, information capable of uniquely identifying the apparatus 100) of the apparatus 100. When the apparatus ID is designated in the debug log information collection plan, the apparatus 100 receiving the debug log information collection plan specifies the apparatus 100 which will transfer a debug log information transmission request.

The apparatus information storage module 160 may store only the log information collection plan 600 or the log information collection plan 700.

FIG. 8 is a diagram illustrating an example of the data structure of the F-ID and IP address correspondence table 800. The F-ID and IP address correspondence table 800 includes an F-ID field 810 and an IP address field 820.

The F-ID field 810 stores information (hereinafter, referred to as F-ID) capable of uniquely identifying the firewall in this exemplary embodiment. For example, information (client ID) capable of uniquely identifying a client or information (office ID) capable of uniquely identifying an office may be used as long as it corresponds to the firewall. The IP address field 820 stores the IP address of the apparatus 100 belonging to the firewall.

Figure 9:
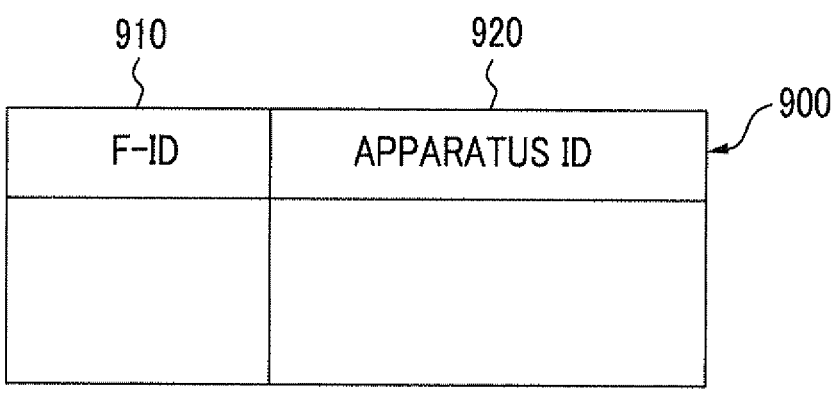
FIG. 9 is a diagram illustrating an example of the data structure of an F-ID and apparatus ID correspondence table.

FIG. 9 is a diagram illustrating an example of the data structure of the F-ID and apparatus ID correspondence table 900. The F-ID and apparatus ID correspondence table 900 includes an F-ID field 910 and an apparatus ID field 920. The F-ID field 910 is the same as the F-ID field 810 of the F-ID and IP address correspondence table 800. The apparatus ID field 920 stores the apparatus ID of the apparatus 100 belonging to the firewall.

The F-ID and IP address correspondence table 800 and the F-ID and apparatus ID correspondence table 900 indicate the apparatus 100 belonging to the firewall. Therefore, an instruction may be given to the apparatus 100(A) such that another apparatus 100(B) with the same F-ID as that of the apparatus 100(A) which has performed communication, such as polling communication, transmits information to the information processing apparatus 150.

The apparatus information storage module 160 may store only the F-ID and IP address correspondence table 800 or the F-ID and apparatus ID correspondence table 900.

Figure 10:
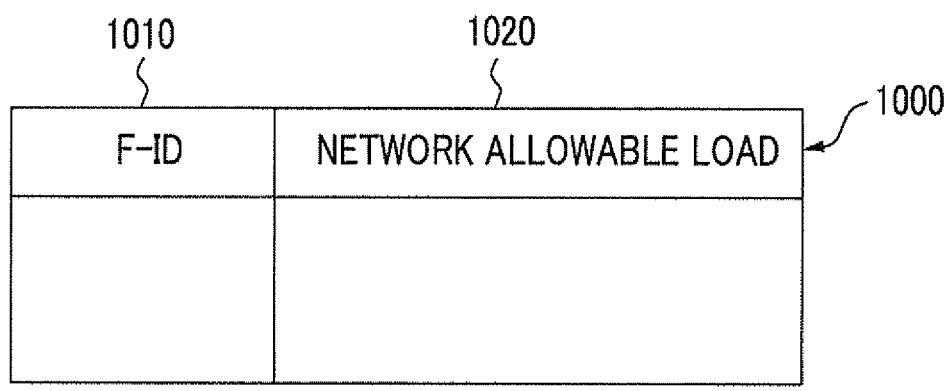
FIG. 10 is a diagram illustrating an example of the data structure of an F-ID and network allowable load correspondence table.

FIG. 10 is a diagram illustrating the data structure of the F-ID and network allowable load correspondence table 1000. The F-ID and network allowable load correspondence table 1000 includes an F-ID field 1010 and a network allowable load field 1020. The F-ID field 1010 stores F-ID. The network allowable load field 1020 stores the load (for example, the limit of communication capacity) which is allowed in the firewall.

Figure 11:
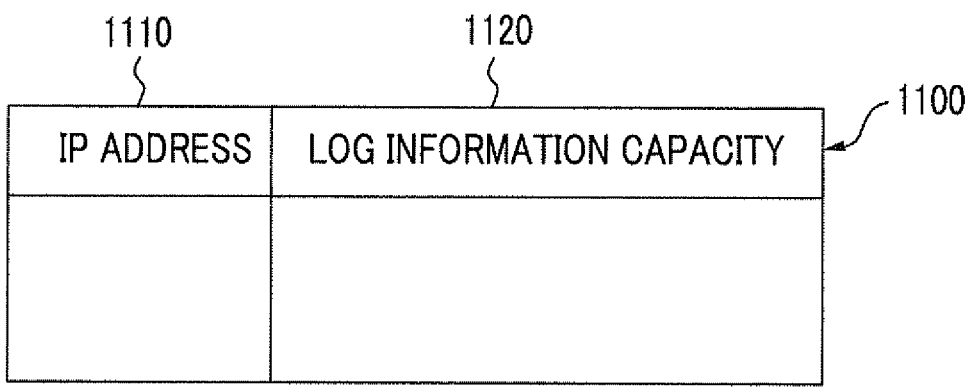
FIG. 11 is a diagram illustrating an example of the data structure of an IP address and log information capacity correspondence table.

FIG. 11 is a diagram illustrating the data structure of the IP address and log information capacity correspondence table 1100. The IP address and log information capacity correspondence table 1100 includes an IP address field 1110 and a log information capacity field 1120. The IP address field 1110 stores the IP address of the apparatus 100. The log information capacity field 1120 stores the capacity of the debug log information stored in the apparatus 100.

FIG. 12 is a diagram illustrating the data structure of the apparatus ID and log information capacity correspondence table 1200. The apparatus ID and log information capacity correspondence table 1200 includes an apparatus ID field 1210 and a log information capacity field 1220. The apparatus ID field 1210 stores the apparatus ID of the apparatus 100. The log information capacity field 1220 is the same as the log information capacity field 1120 of the IP address and log information capacity correspondence table 1100.

The F-ID and network allowable load correspondence table 1000, the IP address and log information capacity correspondence table 1100, and the apparatus ID and log information capacity correspondence table 1200 are for making the debug log information collection plan such that the load of the communication line in the firewall is reduced when the debug log information is transmitted from plural apparatuses 100 at the same time. That is, the capacity of the debug log information stored in the apparatuses 100 from which the debug log information is transmitted at the same time is extracted from the log information capacity field 1120 or the log information capacity field 1220, and the extracted capacity of the debug log information is added and compared with the load which is allowed in the firewall (the load extracted from the network allowable load field 1020). In this way, it is determined whether the debug log information is transmitted from plural apparatuses 100 at the same time.

The apparatus information storage module 160 may store only the IP address and log information capacity correspondence table 1100 and the apparatus ID and log information capacity correspondence table 1200.

In Step S306, the communication module 152 receives a communication from the apparatus 100(A). The communication may be the above-mentioned polling communication, other communications, or a communication from the apparatus 100(A).

In Step S308, the communication analyzing module 154 determines whether the debug log information is received. When the debug log information is received, the process proceeds to Step S310. In the other cases, the process proceeds to Step S312.

In Step S310, the log analyzing module 162 stores the received debug log information in the log information storage module 164 and analyzes the debug log information. Then, the process proceeds to Step S399 (end process).

In Step S312, the communication analyzing module 154 determines whether the F-ID of the apparatus which has performed transmission is in the made debug log information collection plan. When the F-ID of the apparatus is in the debug log information collection plan, the process proceeds to Step S314. In the other cases, the process proceeds to Step S316. That is, it is determined whether the debug log information collection plan made in Step S304 is capable of being applied to the apparatus 100 which has performed communication (another apparatus 100 in the firewall to which the apparatus 100 belongs).

In Step S314, the communication module 152 transmits the corresponding debug log information collection plan to the apparatus which has performed transmission. As the debug log information collection plan to be transmitted, an "instruction to request the apparatus 100(B) to transmit the debug log information stored in the apparatus 100(B)" which is a portion of the debug log information collection plan may be used.

In Step S316, the information processing apparatus 150 performs a process according to the content of the communication from the apparatus. For example, the information processing apparatus 150 performs a normal process according to polling communication.

After Step S310, the process proceeds to Step S399. However, the process proceeds to Step S312.

FIG. 4 is a flowchart illustrating an example of the process according to the first exemplary embodiment (apparatus 100(A)).

In Step S402, the communication module 102 performs communication with the information processing apparatus 150. The communication may be the above-mentioned polling communication, other communication, or communication from apparatus 100(A) to the information processing apparatus 150.

In Step S404, the communication module 102 receives a communication from the information processing apparatus 150.

In Step S406, the communication analyzing module 104 determines whether there is a debug log information transmission request. When there is a debug log information transmission request, the process proceeds to Step S408. In the other cases, the process proceeds to Step S412. That is, it is determined whether there is a debug log information transmission request for the apparatus 100(A), which is the host apparatus.

In Step S408, the log information collecting module 106 collects the debug log information stored in the log information storage module 108.

In Step S410, the communication module 102 transmits the debug log information to the information processing apparatus 150.

In Step S412, the communication analyzing module 104 determines whether there is a debug log information collection plan. When there is a debug log information collection plan, the process proceeds to Step S414. In the other cases, the process proceeds to Step S416. That is, it is determined whether a debug log information transmission request for another apparatus 100(B) is included.

In Step S414, the transferring module 110 transfers according to the debug log information collection plan. That is, the apparatus 100(A) transmits the debug log information transmission request for another apparatus 100(B) to the apparatus 100(B).

In Step S416, the apparatus 100 performs a process according to the content of communication with the information processing apparatus 150. For example, the apparatus 100 performs a normal process according to polling communication.

After Step S410, the process proceeds to Step S416. However, the process proceeds to Step S412.

FIG. 5 is a flowchart illustrating an example of the process according to the first exemplary embodiment (apparatus 100(B)).

In Step S502, the communication module 102 receives a communication from another apparatus (apparatus 100(A)). That is, the communication module 102 receives a communication from another apparatus (apparatus 100(A)) in the firewall to which the host apparatus (apparatus 100(B)) belongs.

In Step S504, the communication analyzing module 104 determines whether there is a debug log information transmission request. When there is a debug log information transmission request, the process proceeds to Step S506. In the other cases, the process proceeds to Step S510.

In Step S506, the log information collecting module 106 collects the debug log information stored in the log information storage module 108.

In Step S508, the communication module 102 transmits the debug log information to the information processing apparatus 150.

In Step S510, the apparatus 100 performs a process according to the content of communication with another apparatus. For example, a predetermined process is performed between the apparatus 100(A) and the apparatus 100(B).

The above will be described using a detailed example.

It is assumed that, in a situation in which there are apparatus A 100A and the apparatus B 100B in the office internal communication environment 210 and debug log information is desired to be collected from each device, the debug log information is collected from each apparatus considering a network load. When the apparatus A 100A performs polling communication with the information processing apparatus 150, a debug log information transmission request for the apparatus A 100A is transmitted to the apparatus A 100A. When receiving the debug log information from the apparatus A 100A, the information processing apparatus 150 instructs the apparatus A 100A to transfer the debug log information transmission request to the apparatus B 100B, in response to the debug log information. The apparatus A 100A transfers the debug log information transmission request to the apparatus B 100B on the basis of the instruction. The apparatus B 100B transmits the debug log information to the information processing apparatus 150 on the basis of the debug log information transmission request.

When 140-MB, 80-MB, 60-MB, and 120-MB debug log information items are desired to be collected from an apparatus A 100A, an apparatus B 100B, an apparatus C 100C, and an apparatus D 100D in the office internal communication environment 210 in which the amount of debug log information which is simultaneously transmitted is limited to 200 MB, respectively, first, a debug log information collection plan (a debug log information collection plan in which the debug log information is transmitted from the apparatus A 100A and the apparatus C 100C at the same time and is then transmitted from the apparatus B 100E and the apparatus D 100D at the same time) is made. When there is polling communication from any one of the apparatus A 100A, the apparatus B 100B, the apparatus C 100C, and the apparatus D 100D, the debug log information transmission request is transmitted to the apparatus A 100A and the apparatus C 100C according to the debug log information collection plan and is transmitted to the apparatus B 100B and the apparatus D 100D according to the reception state of the debug log information. Specifically, the debug log information transmission request for the apparatus B 100B and the apparatus D 100D is transmitted to one of the apparatus A 100A and the apparatus C 100C which has transmitted the debug log information whose reception by the information processing apparatus 150 has been delayed.

Another detailed example will be described with reference to FIG. 13.

The information processing apparatus 150 manages the apparatus ID and F-ID of the apparatus 100 in association with each other (the F-ID and apparatus ID correspondence table 900 shown in FIG. 9). In addition, the information processing apparatus 150 has the debug log information collection plan and the debug log information collection plan is made for each F-ID and may be searched for using the F-ID as a key.

A scene will be described in which there are an apparatus A 100A, an apparatus B 100B, an apparatus C 100C, an apparatus D 100D, and an apparatus E 100E in the office internal communication environment 210 of a given client and the debug log information is collected from the apparatus B 100B, the apparatus C 100C, the apparatus D 100D, and the apparatus E 100E among them.

The plan making module 156 registers a debug log information transmission request for the apparatus B 100B, the apparatus C 100C, the apparatus D 100D, and the apparatus E 100E in the debug log information collection plan.

When there is polling communication from the apparatus A 100A (Step S1302), the information processing apparatus 150 searches for an F-ID corresponding to the apparatus A 100A and also searches for the debug log information collection plan corresponding to the F-ID. Since the debug log information collection plan includes requests for the apparatus B 100B, the apparatus C 100C, the apparatus D 100D, and the apparatus E 100E to transmit the debug log information, the requests are transmission targets.

It is assumed that, in the office internal communication environment 210 with the F-ID, the simultaneous transmission of debug log information of 100 MB or more is limited considering the network load (the F-ID and network allowable load correspondence table 1000 shown in FIG. 10). The size of the debug log information is known in advance according to, for example, the IP address and log information capacity correspondence table 1100, the apparatus ID and log information capacity correspondence table 1200, or the type of apparatus. It is assumed that the sizes of the debug log information items which are desired to be acquired from the apparatus B 100B, the apparatus C 100C, the apparatus D 100D, and the apparatus E 100E are 100 MB, 50 MB, 60 MB, and 40 MB, respectively. The order of the apparatus B 100B→(the apparatus D 100D+the apparatus E 100E)→the apparatus C 100C is calculated as the transmission order in which the collection of the debug log information is completed in the shortest time on the basis of the network load limit and the size of the debug log information (information items in the parentheses are transmitted at the same time). The debug log information collection plan is made of the basis of the transmission order.

The information processing apparatus 150 instructs the apparatus A 100A to transfer the debug log information transmission request to the apparatus B 100B on the basis of the made debug log information collection plan (Step S1304).

When transmitting the debug log information transmission request to the apparatus B 100B, the apparatus A 100A needs to specify the IP address of the apparatus B 100B and establish communication. As the specifying method, any of the following methods is performed.

(1) The information processing apparatus 150 manages the IP address of the apparatus (the log information collection plan 600 shown in FIG. 6) and gives an IP address to the debug log information transmission request. The apparatus (in this case, the apparatus A 100A) transferring the debug log information transmission request transfers on the basis of the IP address given to the debug log information transmission request.

(2) The information processing apparatus 150 manages the apparatus ID (the log information collection plan 700 shown in FIG. 7) and gives an apparatus ID to the debug log information transmission request. The apparatus (in this case, the apparatus A 100A) transferring the debug log information transmission request makes a list of the IP addresses of the apparatuses in the network (office internal communication environment 210) using a protocol, such as SNMP. The apparatus ID is capable of being acquired by any network unit and an apparatus, which is a transmission destination of the debug log information transmission request, is specified on the basis of the IP address list and the apparatus ID of the debug log information transmission request.

The apparatus A 100A establishes communication with the apparatus B 100E using the above-mentioned method and transfers the debug log information transmission request (Step S1306). The apparatus B 100B transmits the debug log information to the information processing apparatus 150 on the basis of the debug log information transmission request (Step S1308).

After receiving the debug log information from the apparatus B 100B, the information processing apparatus 150 instructs the apparatus B 100B to transfer the debug log transmission request to the apparatus D 100D and the apparatus E 100E as a response, on the basis of the debug log information collection plan (Step S1310).

The above-mentioned operation is repeatedly performed until the debug log transmission request is removed from the debug log information collection plan. Specifically, the following process is performed.

In Step S1312, the apparatus B 100B transfers the debug log information transmission plan to the apparatus D 100D.

In Step S1314, the apparatus B 100B transfers the debug log information transmission plan to the apparatus E 100E.

In Step S1316, the apparatus D 100D transmits the debug log information to the information processing apparatus 150.

In Step S1318, the apparatus E 100E transmits the debug log information to the information processing apparatus 150.

In Step S1320, the information processing apparatus 150 instructs the apparatus E 100E to transfer the debug log information transmission plan to the apparatus C 100C.

In Step S1322, the apparatus E 100E transfers the debug log information transmission plan to the apparatus C 100C.

In Step S1324, the apparatus C 1000 transmits the debug log information to the information processing apparatus 150.

When the collection of the debug log information from the apparatus D 100D is not needed before the transmission instruction is transmitted to the apparatus B 100B (specifically, the plan making instruction module 158 receives an operation for deleting the "collection of the debug log information from the apparatus D 100D" from the operator), the debug log transmission request for the apparatus D 100D is deleted from the debug log information collection plan and the debug log information collection plan is updated to the apparatus B 100B→(the apparatus C 100C+the apparatus E 100E). In this case, the debug log transmission request to instruct transmission to the apparatus B 100B becomes a debug log transmission request for the apparatus C 100C and the apparatus E 100E.

In addition, there is a case in which a debug log transmission request for the apparatus A 100A is additionally needed (specifically, a case in which the plan making instruction module 158 receives the operation of the operator adding "the collection of the debug log information from the apparatus A 100A"). When the size of the debug log information which is desired to be collected from the apparatus A 100A is 50 MB, the debug log information collection plan is updated to the apparatus B 100B→(the apparatus D 100D+the apparatus E 100E)→(the apparatus C 100C+the apparatus A 100A).

As such, when the collection of the debug log information does not start even during the execution of the debug log information collection plan, the debug log transmission request in the debug log information collection plan may be deleted and the debug log information collection plan may be made again. In addition, a debug log transmission request may be added even during the execution of the debug log information collection plan and the debug log information collection plan may be made again.

Second Exemplary Embodiment

The structure of a second exemplary embodiment is the same as the module structure according to the first exemplary embodiment shown in FIG. 1.

A communication analyzing module 104 of an apparatus 100(A) determines whether a communication module 102 receives a plan for a transmission order or a transmission date and time from an information processing apparatus 150.

When the communication analyzing module 104 determines that the plan for the transmission order or the transmission date and time is received from the information processing apparatus 150, a transmitting module 110 of the apparatus 100(A) transmits an instruction (information transmission instruction) to the apparatus 100(B) in the plan through the communication module 102 and a communication line 199 on the basis of the plan.

A communication module 102 of the apparatus 100(B) receives the instruction from the apparatus 100(A).

A communication analyzing module 104 of the apparatus 100(B) determines whether the communication module 102 receives the instruction (information transmission instruction) from the apparatus 100(A).

When the communication analyzing module 104 determines that the instruction (information transmission instruction) is received from the apparatus 100(A), a log information collecting module 106 of the apparatus 100(B) transmits information stored in the log information storage module 108 to the information processing apparatus 150 through the communication module 102 and the communication line 199. Then, the information collecting module 106 transmits the information which has been stored in the log information storage module 108 of the host apparatus (apparatus 100(B)) and then transmitted to the information processing apparatus 150 to the apparatus 100(A) which has transmitted the instruction through the communication module 102 and the communication line 199.

In the first exemplary embodiment, the information processing apparatus 150 controls the collection of information from the apparatus 100(B). However, in the second exemplary embodiment, after receiving an instruction (instruction including a plan) from the information processing apparatus 150, the apparatus 100(A) controls the transmission of information to another apparatus 100(B). First, the apparatus 100(A) transfers an instruction (instruction to transmit information to the information processing apparatus 150) to the apparatus 100(B). After transmitting the information stored in the log information storage module 108 to the information processing apparatus 150, the apparatus 100(B) notifies the apparatus 100(A) that the transmission of the information has been completed. Then, the apparatus 100(A) transfers the next information transmission instruction to another apparatus 100(C) on the basis of a transmission plan for the information transmission instruction (when the transmission plan is a plan for "the date and time", for example, the following two methods are considered. The information transmission instruction is not transferred to another apparatus 100(C) immediately after information indicating the completion of transmission is notified to the apparatus 100(A), but the apparatus 100(A) transfers the information transmission instruction to the apparatus 100(C) at the date and time when the transmission of information to the apparatus 100(C) is required in the transmission plan. Alternatively, when information indicating the completion of transmission is notified to the apparatus 100(A), the information transmission instruction and the transmission plan are transmitted to the apparatus 100(C), and the apparatus 100(C) does not transmit the stored information to the log information storage module 108 immediately after the information transmission instruction is received, but transmits the information to the log information storage module 108 at the date and time when the transmission of information to the apparatus 100(C) is required in the plan). These operations are repeatedly performed until all of the transmission plan for the information transmission instruction is executed.

A detailed example will be described with reference to FIG. 14. FIG. 14 is a flowchart illustrating an example of a process according to the second exemplary embodiment. A case in which the same debug log information collection plan as that shown in FIG. 13 is made will be described.

In Step S1402, an apparatus A 100A performs polling communication with the information processing apparatus 150.

In Step S1404, the information processing apparatus 150 transmits a debug log information collection plan to the apparatus A 100A.

In Step S1406, the apparatus A 100A transmits a debug log transmission instruction to an apparatus B 100B.

In Step S1408, the apparatus B 100B transmits debug log information to the information processing apparatus 150.

In Step S1410, the apparatus B 100B transmits a log transmission completion notice indicating the completion of the transmission of the debug log information to the apparatus A 100A.

In Step S1412, the apparatus A 100A transmits the debug log transmission instruction to the apparatus D 1000.

In Step S1414, the apparatus A 100A transmits the debug log transmission instruction to the apparatus E 100E.

In Step S1416, the apparatus D 100D transmits the debug log information to the information processing apparatus 150.

In Step S1418, the apparatus D 100D transmits the log transmission completion notice to the apparatus A 100A.

In Step S1420, the apparatus E 100E transmits the debug log information to the information processing apparatus 150.

In Step S1422, the apparatus E 100E transmits the log transmission completion notice to the apparatus A 100A.

In Step S1424, the apparatus A 100A transmits the debug log transmission instruction to the apparatus C 1000.

In Step S1426, the apparatus C 1000 transmits the debug log information to the information processing apparatus 150.

In Step S1428, the apparatus C 1000 transmits the log transmission completion notice to the apparatus A 100A.

Third Exemplary Embodiment

An example of the structure of a third exemplary embodiment is the same as the module structure according to the first exemplary embodiment shown in FIG. 1.

A communication analyzing module 104 of an apparatus 100(A) determines whether a communication module 102 receives a plan for a transmission order or a transmission date and time from an information processing apparatus 150.

When the communication analyzing module 104 determines that the plan for the transmission order or the transmission date and time is received from the information processing apparatus 150, a transferring module 110 of the apparatus 100(A) transmits the plan to, for example, an apparatus 100 (B) in the plan through a communication module 102 and a communication line 199 on the basis of the plan. That is, the transferring module 110 transmits the plan.

For example, after a log information collecting module 106 transmits information stored in a log information storage module 108 of the host apparatus (for example, the apparatus 100(B)) to the information processing apparatus 150, a transferring module 110 of the apparatus 100(B) transmits the plan to the next apparatus 100(C) to which the plan is to be transmitted in the plan through the communication module 102 and the communication line 199 on the basis of the plan.

That is, in the third exemplary embodiment, the plan is relayed to the next apparatus 100. Each apparatus 100 transmits a process which is to be processed by the host apparatus (a process of transmitting information to the information processing apparatus 150) in the plan. Then, each apparatus 100 transfers the plan to the next apparatus 100 which is to perform the process. The control of the transmission of the plan is sequentially transferred to the next apparatus 100.

In the above description, the plan is transmitted. However, a plan from which a portion executed by the host apparatus is removed may be transmitted.

In the third exemplary embodiment, when each apparatus 100 transmits information, it is possible to transmit the plan without any change. However, when two or more apparatuses transmit information at the same time, the plan is transmitted considering a communication allowable range. Therefore, two or more apparatuses 100 to which the control of the transmission of the plan is transferred may be synchronized with each other. That is, when the plan is determined by the transmission order and there are plural apparatuses 100 in the same order, the apparatuses 100 are synchronized with each other so as to start the transmission of information at the same time.

A detailed example will be described with reference to FIG. 15. FIG. 15 is a diagram (including the flow of a process) illustrating an example of the process according to the third exemplary embodiment.

In Step S1502, an operator 1580 requests the information processing apparatus 150 to transmit the debug log information.

In Step S1504, an apparatus A 100A performs polling communication with the information processing apparatus 150.

In Step S1506, the information processing apparatus 150 requests the apparatus A 100A to transmit the debug log information.

In Step S1508, the apparatus A 100A transmits the debug log information to the information processing apparatus 150.

In Step S1510, the information processing apparatus 150 requests the apparatus A 100A to transmit the debug log information to an apparatus B 1005. The apparatus A 100A transfers the debug log information transmission request to the apparatus B 100B.

In Step S1512, the apparatus B 1003 transmits the debug log information to the information processing apparatus 150.

In Step S1514, the information processing apparatus 150 requests the apparatus B 100B to transmit the debug log information to an apparatus C 100C. Then, the apparatus B 1008 transmits the debug log information transmission request to the apparatus C 100C.

In Step S1516, the apparatus C 100C transmits the debug log information to the information processing apparatus 150.

In Step S1518, the information processing apparatus 150 presents the debug log information to a developer 1590.

Figure 16:
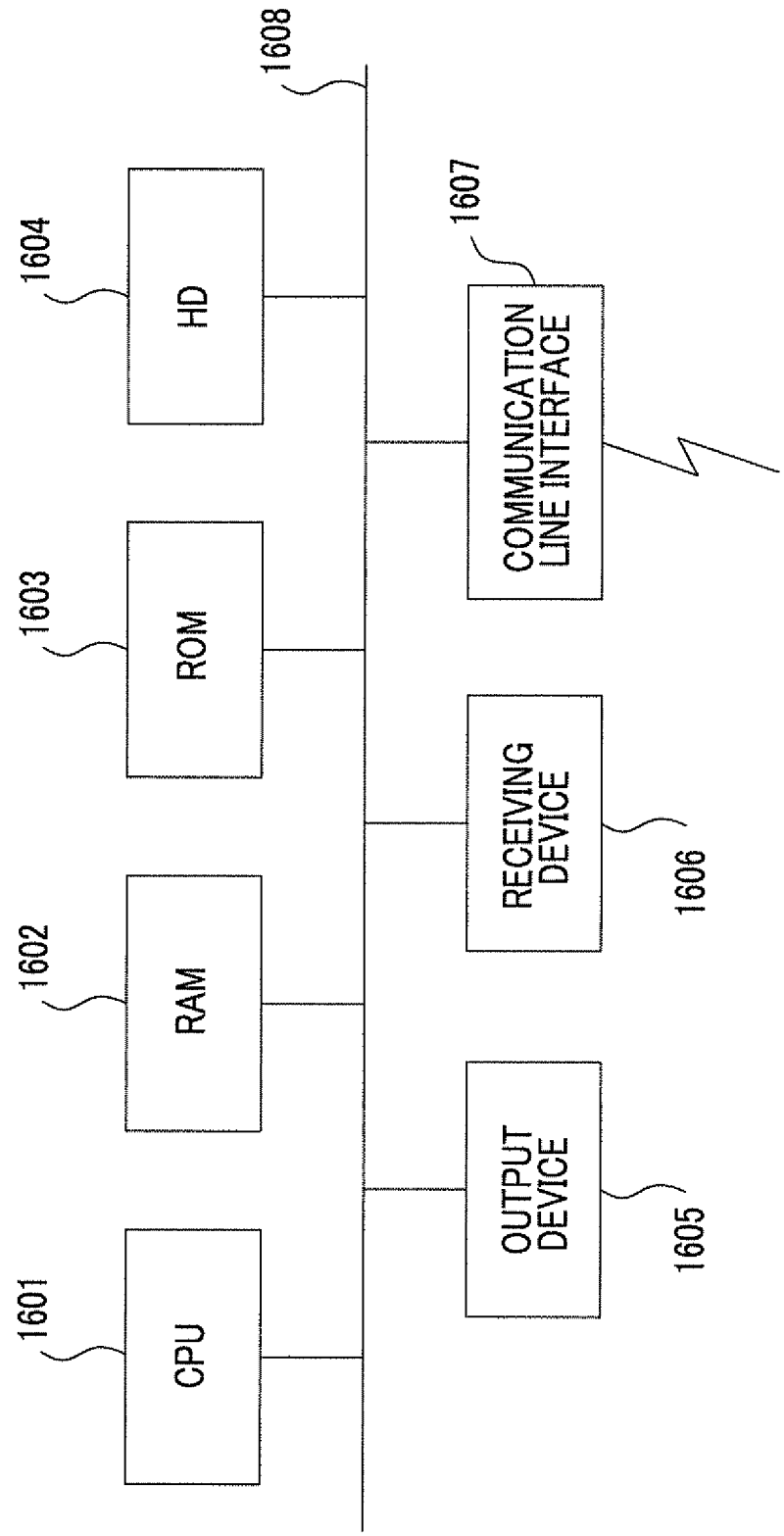
FIG. 16 is a block diagram illustrating an example of the hardware structure of a computer for implementing an information processing apparatus according to this exemplary embodiment.

FIG. 16 shows the hardware structure of a computer that executes a program to implement the information processing apparatus 150 according to this exemplary embodiment. The computer is a general computer and is specifically a personal computer or a server. That is, for example, a CPU 1601 is used as a processing unit (arithmetic unit), and a RAM 1602, a ROM 1603, and an HD 1604 are used as storage devices. For example, a hard disk may be used as the HD 1604. The computer includes the CPU 1601 that executes a program to implement the functions of, for example, the communication module 152, the communication analyzing module 154, the plan making module 156, the plan making instruction module 158, and the log analyzing module 162, the RAM 1602 that stores the program or data, the ROM 1603 that stores, for example, a program for starting the computer, the HD 1604, which is an auxiliary storage device, a receiving device 1606 that receives data on the basis of the operation of the user for a keyboard, a mouse, or a touch panel, an output device 1605, such as a CRT or a liquid crystal display, a communication line interface 1607, such as a network interface card for connection to a communication network, and a bus 1608 that connects the devices for data communication. Plural computers may be connected to each other by a network.

For a computer program in the above-described exemplary embodiment, the system with this hardware structure reads the computer program, which is software, and the above-described exemplary embodiment is implemented by cooperation between software and hardware resources.

The hardware structure shown in FIG. 16 is an illustrative example, but this exemplary embodiment is not limited to the hardware structure shown in FIG. 16. This exemplary embodiment may have any configuration as long as it may execute the modules described in this exemplary embodiment. For example, some modules may be configured as dedicated hardware components (for example, ASIC) and some modules may be provided in an external system and connected by a communication line. In addition, plural systems shown in FIG. 16 may be connected to each other by a communication line so as to cooperate with each other.

An example of the hardware structure of the apparatus 100 according to this exemplary embodiment will be described with reference to FIG. 17. The structure shown in FIG. 17 is formed by, for example, a personal computer (PC) and FIG. 17 shows an example of the hardware structure including a data reading unit 1717, such as a scanner, and a data output unit 1718, such as a printer. Specifically, FIG. 17 shows an example of an apparatus serving as an image processing apparatus.

A Central Processing Unit (CPU) 1701 is a control unit that performs a process based on a computer program in which the execution sequence of various kinds of modules according to the above-described exemplary embodiment, that is, the communication module 102, the communication analyzing module 104, the log information collecting module 106, and the transferring module 110 is described.

A Read Only Memory (ROM) 1702 stores, for example, programs or operation parameters used by the CPU 1701. A Random Access Memory (RAM) 1703 stores, for example, the program used in the execution of the CPU 1701 or parameters which are appropriately changed in the execution. These components are connected to each other by a host bus 1704 which is, for example, a CPU bus.

The host bus 1704 is connected to an external bus 1706, such as a Peripheral Component Interconnect/Interface (PCI) bus, through a bridge 1705.

A keyboard 1708 and a pointing device 1709, such as a mouse, are input devices operated by the operator. A display 1710 is, for example, a liquid crystal display device or a Cathode Ray Tube (CRT) and displays various kinds of information as text or image information.

A Hard Disk Drive (HDD) 1711 is provided with a hard disk and drives the hard disk to record or reproduce the program executed by the CPU 1701 or information. The hard disk stores, for example, the log information and the plan. In addition, the hard disk stores various other computer programs, such as data processing programs.

A drive 1712 reads data or programs recorded on an inserted removable recording medium 1713, such as a magnetic disk, an optical disk, a magneto-optical disk, or a semiconductor memory, and supplies the data or program to the RAM 1703 through an interface 1707, the external bus 1706, the bridge 1705, and the host bus 1704. The removable recording medium 1713 may be used as a data recording area, similarly to the hard disk.

A connection port 1714 is for connection to an external connection apparatus 1715 and has a connection unit, such as a USB or IEEE1394. The connection port 1714 is connected to, for example, the CPU 1701 through the interface 1707, the external bus 1706, the bridge 1705, and the host bus 1704. A communication unit 1716 is connected to a communication line and performs data communication with the outside. A data reading unit 1717 is, for example, a scanner and performs a process of reading a document. The data output unit 1718 is, for example, a printer and performs a process of outputting document data.

The hardware structure of the apparatus shown in FIG. 17 is an illustrative example, but this exemplary embodiment is not limited to the structure shown in FIG. 17. This exemplary embodiment may have any configuration as long as it may execute the modules described in this exemplary embodiment. For example, some modules may be configured as dedicated hardware components (for example, Application Specific Integrated Circuit: ASIC) and some modules may be provided in an external system and connected by a communication line. In addition, plural systems shown in FIG. 17 may be connected to each other by a communication line so as to cooperate with each other.

The above-mentioned program may be stored in a recording medium and then provided. In addition, the above-mentioned program may be provided by a communication unit. In this case, for example, the above-mentioned program may be understood as the invention of a "computer-readable recording medium having a program recorded thereon".

The "computer-readable recording medium having a program recorded thereon" refers to a computer-readable recording medium having a program recorded thereon which is used to, for example, install, execute, and distribute the program.

Examples of the recording medium may include digital versatile discs (DVDs), such as "DVD-R, DVD-RW, and DVD-RAM" which are the standards defined by the DVD Forum, and "DVD+R and DVD+RW" which are the standards defined by DVD+RW, compact discs (CDs), such as a read-only memory (CD-ROM), CD recordable (CD-R), and CD rewritable (CD-RW), a Blu-ray disc (registered trademark), a magneto-optical disc (MO), a flexible disk (FD) a magnetic tape, a hard disk, a read only memory (ROM), an electrically erasable programmable read-only memory (EE- PROM (registered trademark)), a flash memory, a random access memory (RAM), and a Secure Digital (SD) memory card.

The program or a part thereof may be recorded and stored in the recording medium and then distributed. In addition, the program or a part thereof may be transmitted by communication using transmission media, such as wired networks including a local area network (LAN), a metropolitan area network (MAN), a wide area network (WAN), the Internet, an intranet, and an extranet, wireless communication networks, and combinations thereof. In addition, the program or a part thereof may be transmitted using carrier waves.

The program may be a part of another program, or it may be recorded on the recording medium along with a separate program. In addition, the program may be divided and recorded on plural recording media. In addition, the program may be recorded in any form including, for example, compression and encryption as long as it may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   an information processing apparatus in a first network;
   a first apparatus that is in a second network and is connected to the information processing apparatus through a firewall interposed between the first network and the second network; and
   a second apparatus that is in the second network and is connected to the information processing apparatus through the firewall,
   wherein the information processing apparatus includes:
   a first receiving unit that receives a communication from the first apparatus, and
   a first transmitting unit that transmits, in response to the communication from the first apparatus, a first instruction to transmit information stored in the first apparatus and a second instruction to transmit information stored in the second apparatus,
   wherein the first apparatus includes:
   a second receiving unit that receives the first instruction and the second instruction from information processing apparatus,
   a second transmitting unit that transmits information to the information processing apparatus in accordance with the first instruction, and
   a first forwarding unit that forwards, upon finishing transmission of the information to the information processing apparatus, the second instruction to the second apparatus
   wherein the second apparatus includes:
   a third receiving unit that receives the second instruction forwarded by the first apparatus, and
   a third transmitting unit that transmits the information to the information processing apparatus according to the second instruction,
   wherein the first and second apparatus are multi-function machines having two or more functions of a scanner, a printer, a facsimile machine and a copier.

2. The information processing apparatus according to claim 1, further comprising:
   a plan making unit that, when there are a plurality of second apparatuses that request the transmission of information, makes a plan for a transmission order or a transmission date and time,
   wherein the transmitting unit transmits the instruction to the first apparatus on the basis of the plan made by the plan making unit.

3. The information processing apparatus according to claim 2,
   wherein the plan making unit makes the plan on the basis of a communication allowable range of the firewall and a capacity of information transmitted by the apparatus.

4. The apparatus according to claim 1,
   wherein, when the first receiving unit receives a plan for a transmission order or a transmission date and time from the information processing apparatus, the first transmitting unit transmits, to an apparatus in the plan, an instruction to request the apparatus in the plan to transmit information stored in the apparatus in the plan to the information processing apparatus on the basis of the plan, and
   the third transmitting unit transmits a notice indicating that the second transmitting unit has transmitted the information stored in a host apparatus to the information processing apparatus to the apparatus which has transmitted the instruction.

5. The apparatus according to claim 1
   wherein, when the first receiving unit receives a plan for a transmission order or a transmission date and time from the information processing apparatus, the first transmitting unit transmits the plan to an apparatus in the plan, and
   after the second transmitting unit transmits the information stored in the host apparatus to the information processing apparatus, the third transmitting unit transmits at least a portion of the plan which is not executed to the next apparatus which is a transmission target in the plan.

6. A non-transitory computer readable medium storing an information processing program that causes a computer to function as:
   a first receiving unit that receives a communication from a first apparatus that is in a second network and is connected to an information processing apparatus through a firewall interposed between the first network and the second network, and
   a first transmitting unit that transmits, in response to the communication from the first apparatus, a first instruction to transmit information stored in the first apparatus and a second instruction to transmit information stored in a second apparatus that is in the second network and is connected to the information processing apparatus through the firewall,
   second receiving unit that receives the first instruction and the second instruction from the information processing apparatus,
   a second transmitting unit that transmits information to the information processing apparatus in accordance with the first instruction,
   a first forwarding unit that forwards, upon finishing transmission of the information to the information processing apparatus, the second instruction to the second apparatus a third receiving unit that receives the second instruction forwarded by the first apparatus, and
a third transmitting unit that transmits the information to the information processing apparatus according to the second instruction,
wherein the first and second apparatus multi-function machines two or more functions of a scanner, a printer, a facsimile machine and a copier.

* * * * *